United States Patent
Ohashi et al.

(10) Patent No.: US 11,644,789 B2
(45) Date of Patent: May 9, 2023

(54) MOTOR CONTROL APPARATUS AND IMAGE FORMING APPARATUS

(71) Applicant: Canon Kabushiki Kaisha, Tokyo (JP)

(72) Inventors: Eijiro Ohashi, Tokyo (JP); Yasukazu Maeda, Kanagawa (JP); Takuya Miyashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 17/333,279

(22) Filed: May 28, 2021

(65) Prior Publication Data

US 2021/0373484 A1 Dec. 2, 2021

(30) Foreign Application Priority Data

May 29, 2020 (JP) .............................. JP2020-094909

(51) Int. Cl.
| | |
|---|---|
| H02P 21/14 | (2016.01) |
| G03G 21/16 | (2006.01) |
| H02P 6/16 | (2016.01) |
| H02P 6/28 | (2016.01) |
| H02K 9/04 | (2006.01) |
| H02K 1/2753 | (2022.01) |
| H02M 7/5387 | (2007.01) |
| H02K 1/16 | (2006.01) |

(52) U.S. Cl.
CPC ............... *G03G 21/16* (2013.01); *H02K 9/04* (2013.01); *H02P 6/16* (2013.01); *H02P 6/28* (2016.02); *H02K 1/16* (2013.01); *H02K 1/2753* (2013.01); *H02M 7/53871* (2013.01)

(58) Field of Classification Search
CPC . H02P 6/28; H02P 6/16; H02P 21/141; H02K 9/04
See application file for complete search history.

(56) References Cited

U.S. PATENT DOCUMENTS

| | | | |
|---|---|---|---|
| 5,592,058 A * | 1/1997 | Archer | F24F 11/41 |
| | | | 318/400.11 |
| 10,642,204 B2 | 5/2020 | Sakai et al. | |
| 2016/0226430 A1* | 8/2016 | Tachibana | G03G 15/5004 |
| 2018/0019700 A1* | 1/2018 | Suzuki | H02P 21/141 |
| 2019/0265624 A1 | 8/2019 | Sakai et al. | |
| 2020/0235684 A1 | 7/2020 | Maeda et al. | |
| 2020/0235689 A1 | 7/2020 | Miyashita et al. | |

FOREIGN PATENT DOCUMENTS

| | | |
|---|---|---|
| JP | 2007236015 A | 9/2007 |
| JP | 2010148322 A | 7/2010 |
| JP | 2019148700 A | 9/2019 |

* cited by examiner

*Primary Examiner* — Cortez M Cook
(74) *Attorney, Agent, or Firm* — Venable LLP

(57) ABSTRACT

A motor control apparatus excites an excitation phase targeted for excitation among a plurality of excitation phases of a motor. The motor control apparatus, in a state in which a rotor of the motor is stopped, excites an excitation phase corresponding to a stop position of the rotor among the plurality of the excitation phases, and measures a physical quantity which changes in accordance with an inductance of at least one of a plurality of coils configuring the plurality of excitation phases. The motor control apparatus estimates a temperature of the rotor from a measurement value of the measured physical quantity, and decides a parameter value for control of the motor based on the estimated temperature.

22 Claims, 12 Drawing Sheets

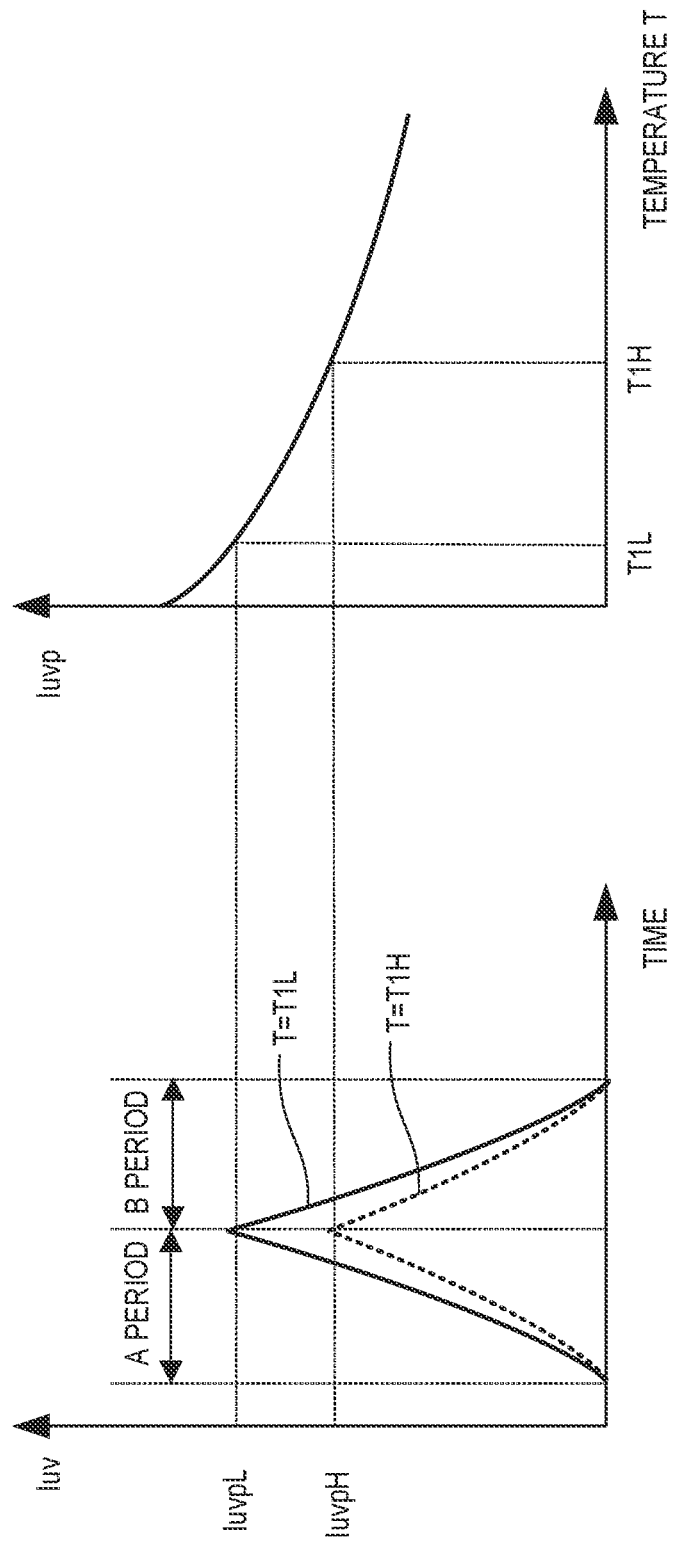

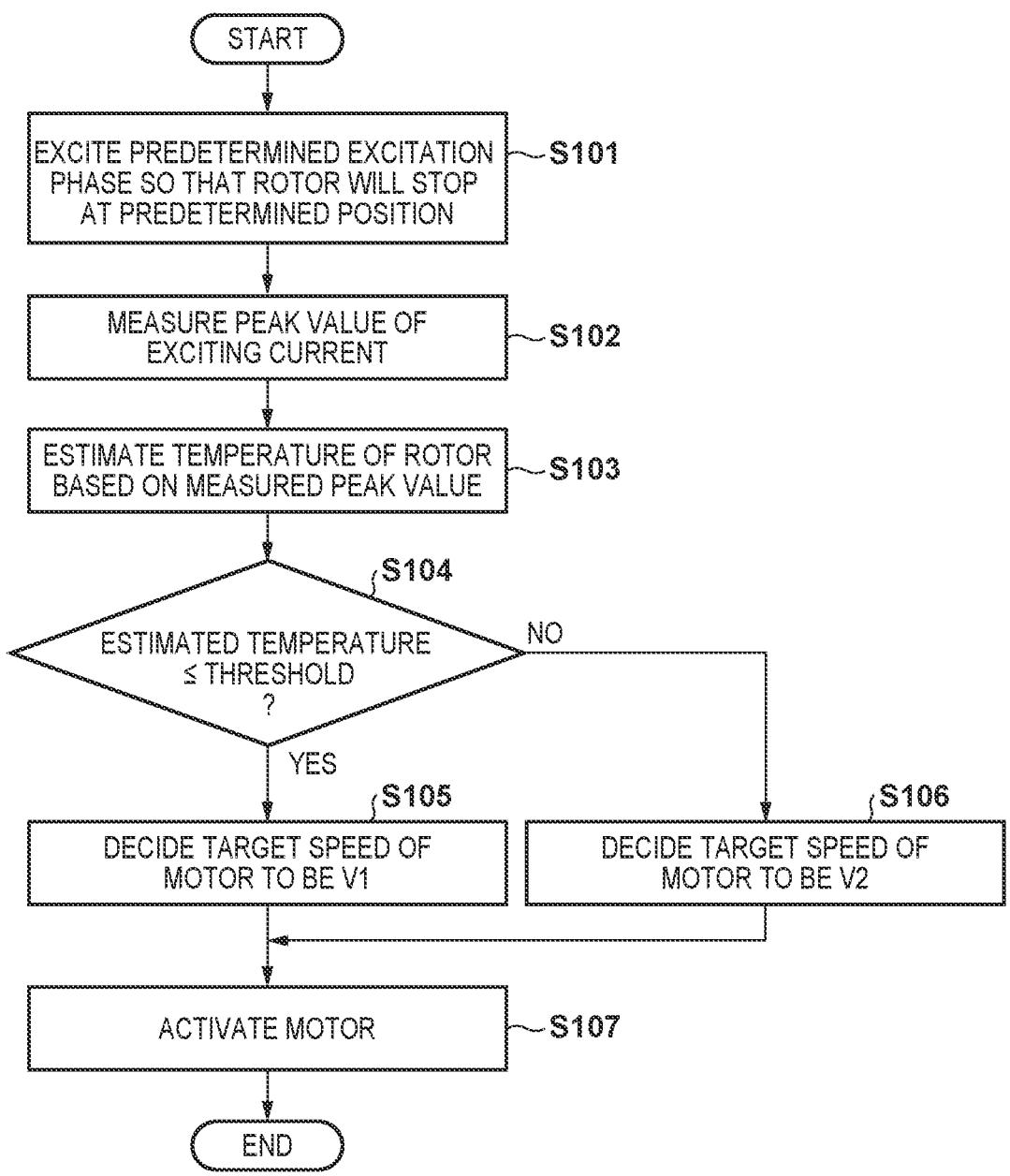

MOTOR CONTROL APPARATUS AND IMAGE FORMING APPARATUS

BACKGROUND OF THE INVENTION

Field of the Invention

The present invention relates to a motor control apparatus and an image forming apparatus.

Description of the Related Art

For a motor, such as a DC brushless motor used as a driving source of a rotating member in an image forming apparatus, when a large output is requested, the amount of heat generated from a coil or magnet used in the motor can become large. By this, when the temperature of each member of the motor rises, a change in the control characteristics of the motor occurs. For example, when the temperature of a magnet of the motor becomes high, the magnet demagnetizes and the torque that the motor can output decreases. Also, when the temperature of a coil of the motor becomes high, a parameter value such as a resistance value and an inductance value of the coil changes and the control characteristics of the exciting current flowing to the motor change.

In Japanese Patent Laid-Open No. 2019-148700, a configuration is described in which a temperature sensor is arranged in a motor, and in an image forming apparatus that obtains a torque value of the motor based on a measurement value of the motor current, a measurement value is corrected so as to cancel an amount of change in the current due to a change of the motor characteristics in accordance with the temperature state of the motor. In Japanese Patent Laid-Open No. 2010-148322, a configuration is described in which the temperature of a coil after activation of a motor is estimated, and a limit value of the torque outputted by the motor is calculated based on the estimated value.

However, in a case where a temperature sensor for detecting the temperature of a motor is needed, extra space within an apparatus in which the sensor and a corresponding circuit is to be installed can become necessary. Also, in a case where the temperature of the motor after activation of the motor is to be detected, the time required for motor control can be long.

SUMMARY OF THE INVENTION

Accordingly, the present invention provides a technique for making it possible to perform motor control based on the temperature state of a motor without arranging a temperature sensor.

According to one aspect of the present invention, there is provided a motor control apparatus, comprising: an excitation unit configured to excite an excitation phase targeted for excitation among a plurality of excitation phases of a motor; a measurement unit configured to, in a state in which a rotor of the motor is stopped, excite, by the excitation unit, an excitation phase corresponding to a stop position of the rotor among the plurality of the excitation phases, and to measure a physical quantity which changes in accordance with an inductance of at least one of a plurality of coils configuring the plurality of excitation phases; an estimation unit configured to estimate a temperature of the rotor from a measurement value of the physical quantity measured by the measurement unit; and a decision unit configured to decide a parameter value for control of the motor based on an estimated temperature obtained by the estimation unit.

According to another aspect of the present invention, there is provided a motor control apparatus, comprising: an excitation unit configured to excite an excitation phase targeted for excitation among a plurality of excitation phases of a motor; a measurement unit configured to, in a state in which a rotor of the motor is stopped, excite, by the excitation unit, an excitation phase corresponding to a stop position of the rotor among the plurality of the excitation phases, and to measure a physical quantity which changes in accordance with an inductance of at least one of a plurality of coils configuring the plurality of excitation phases; and a decision unit configured to decide a parameter value for control of the motor based on the physical quantity measured by the measurement unit.

According to still another aspect of the present invention, there is provided an image forming apparatus comprising: a rotating member for conveying a sheet along a conveyance path; an image forming unit configured to form an image on the sheet conveyed along the conveyance path; a motor configured to drive the rotating member or the image forming unit; and a motor control apparatus configured to control the motor, wherein the motor control apparatus comprises: an excitation unit configured to excite an excitation phase targeted for excitation among a plurality of excitation phases of a motor; a measurement unit configured to, in a state in which a rotor of the motor is stopped, excite, by the excitation unit, an excitation phase corresponding to a stop position of the rotor among the plurality of the excitation phases, and to measure a physical quantity which changes in accordance with an inductance of at least one of a plurality of coils configuring the plurality of excitation phases; an estimation unit configured to estimate a temperature of the rotor from a measurement value of the physical quantity measured by the measurement unit; and a decision unit configured to decide a parameter value for control of the motor based on an estimated temperature obtained by the estimation unit.

Further features of the present invention will become apparent from the following description of exemplary embodiments (with reference to the attached drawings).

BRIEF DESCRIPTION OF THE DRAWINGS

FIGS. 5A and 5B illustrate an example of a relationship between an exciting current flowing through a coil and a temperature T of a rotor.

FIG. 6 is a flowchart for illustrating a processing procedure performed by a control unit.

DESCRIPTION OF THE EMBODIMENTS

Figure 1:
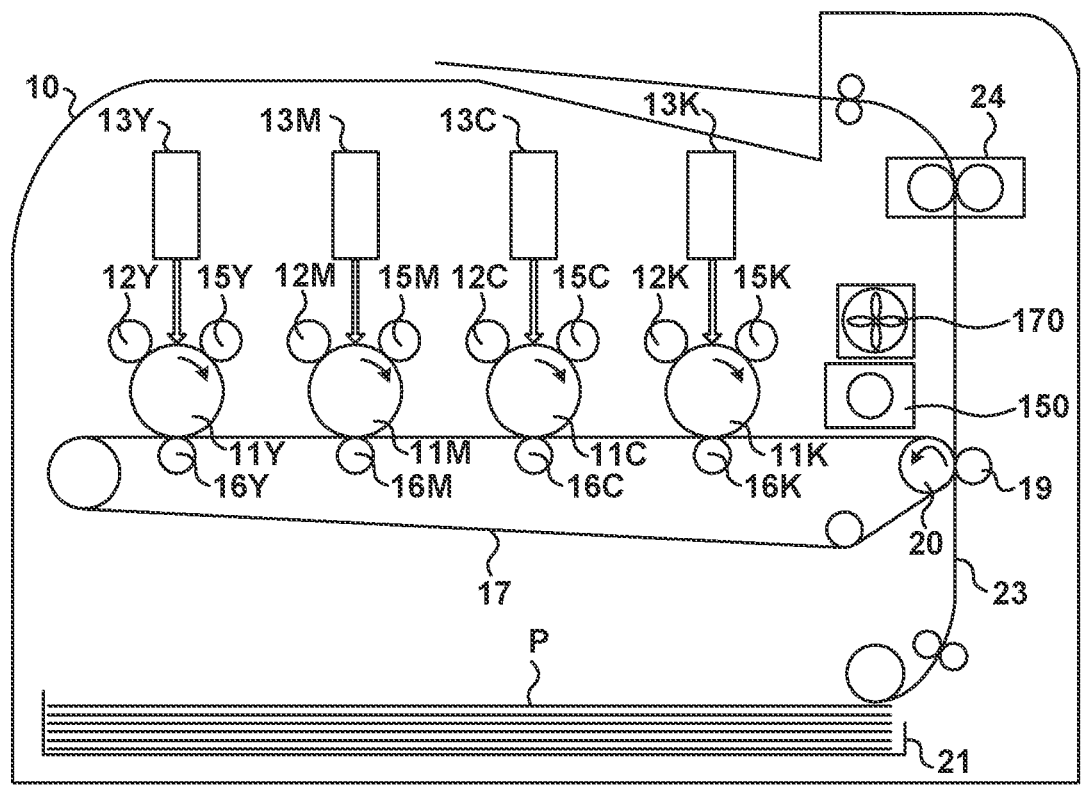
FIG. 1 is a cross-sectional view for illustrating an example of a hardware configuration of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the first to third embodiment, a case in which a motor control apparatus is arranged in an image forming apparatus such as a printing apparatus (printer), a copying machine, a multi-function peripheral, or a facsimile apparatus is described.

<Image Forming Apparatus>

FIG. 1 is a cross-sectional view for illustrating an example of a hardware configuration of an image forming apparatus according to the first present embodiment. An image forming apparatus 10 overlays toner images of four colors, namely yellow (Y), magenta (M), cyan (C), and black (K) to form a full-color image. In FIG. 1, Y, M, C and K at the ends of reference numerals indicate that the colors of toner images with which members denoted by the reference signs are involved when the toner images were formed are respectively yellow, magenta, cyan, and black. Note that, in the following description, when it is not necessary to distinguish colors, reference signs without Y, M. C and K at their ends are used.

The image forming apparatus 10 includes, for each color of a toner image of a formation target, at least a photosensitive member 11, a charging unit 12, an exposure unit 13, a developing roller 15 (a developing device), and a primary transfer unit 16. The image forming apparatus 10 further includes at least an intermediate transfer belt 17 (an intermediate transfer member), a secondary transfer unit 19, a driving roller 20, a feed cassette 21, a conveyance path 23, a fixing unit 24, a motor 150, and a fan 170. The photosensitive member 11, the charging unit 12, the developing roller 15, the primary transfer unit 16, the intermediate transfer belt 17, the secondary transfer unit 19, and the fixing unit 24 configure an image forming unit which forms an image on a recording material P (a sheet) which is fed from the feed cassette 21 to be conveyed on the conveyance path 23.

The photosensitive member 11 is rotationally driven to rotate in a clockwise direction in FIG. 1 at a time of image formation. The charging unit 12 charges the surface of the photosensitive member 11 to a uniform potential. The exposure unit 13 forms an electrostatic latent image on the photosensitive member 11 by exposing the surface of the photosensitive member 11 with light based on image data of a formation target image. The developing roller 15 develops an electrostatic latent image of the photosensitive member 11 by a toner to visualize the electrostatic latent image as the toner image. The primary transfer unit 16 transfers the toner image formed on the photosensitive member 11, onto the intermediate transfer belt 17 based on a primary transfer bias. Note that, as a result of toner images formed on each photosensitive member 11 being overlaid and transferred onto the intermediate transfer belt 17, a full-color image is formed on the intermediate transfer belt 17.

The intermediate transfer belt 17 is rotationally driven by the driving roller 20 to rotate in a counterclockwise direction in FIG. 1. By this, the toner image transferred onto the intermediate transfer belt 17 is conveyed to an opposite position of the secondary transfer unit 19. Meanwhile, the recording material P (the sheet) stored in the feed cassette 21 is fed in the conveyance path 23 and conveyed to the opposite position of the secondary transfer unit 19 along the conveyance path 23. In the conveyance path 23, a conveyance roller for conveying the recording material P is disposed. The secondary transfer unit 19 transfers the toner image on the intermediate transfer belt 17 onto the recording material P based on a secondary transfer bias. After this, the recording material P is conveyed to the fixing unit 24. The fixing unit 24 fixes the toner image on the recording material P by adding heat and pressure to the recording material P. After fixing of the toner image, the recording material P is discharged to outside of the image forming apparatus 10.

In the present embodiment, the motor 150 is configured as a DC brushless motor. A drive force of the motor 150 is delivered to the photosensitive member 11, the charging unit 12, the developing roller 15, the primary transfer unit 16, and the driving roller 20 via a gear mechanism (not illustrated). Also, a drive force of the motor 150 is delivered, via the gear mechanism, to a conveyance roller (a rotational member) for conveying the recording material P along a conveyance path. Accordingly, the motor 150 is used as a driving source of a conveyance roller (a rotational member) for conveying the recording material P (a sheet) along a conveyance path or a driving source of an image formation unit which forms an image on the sheet conveyed on a conveyance path. The fan 170 is used for cooling down the motor 150. The motor 150 is also used as a driving source of the fan 170.

Figure 2:
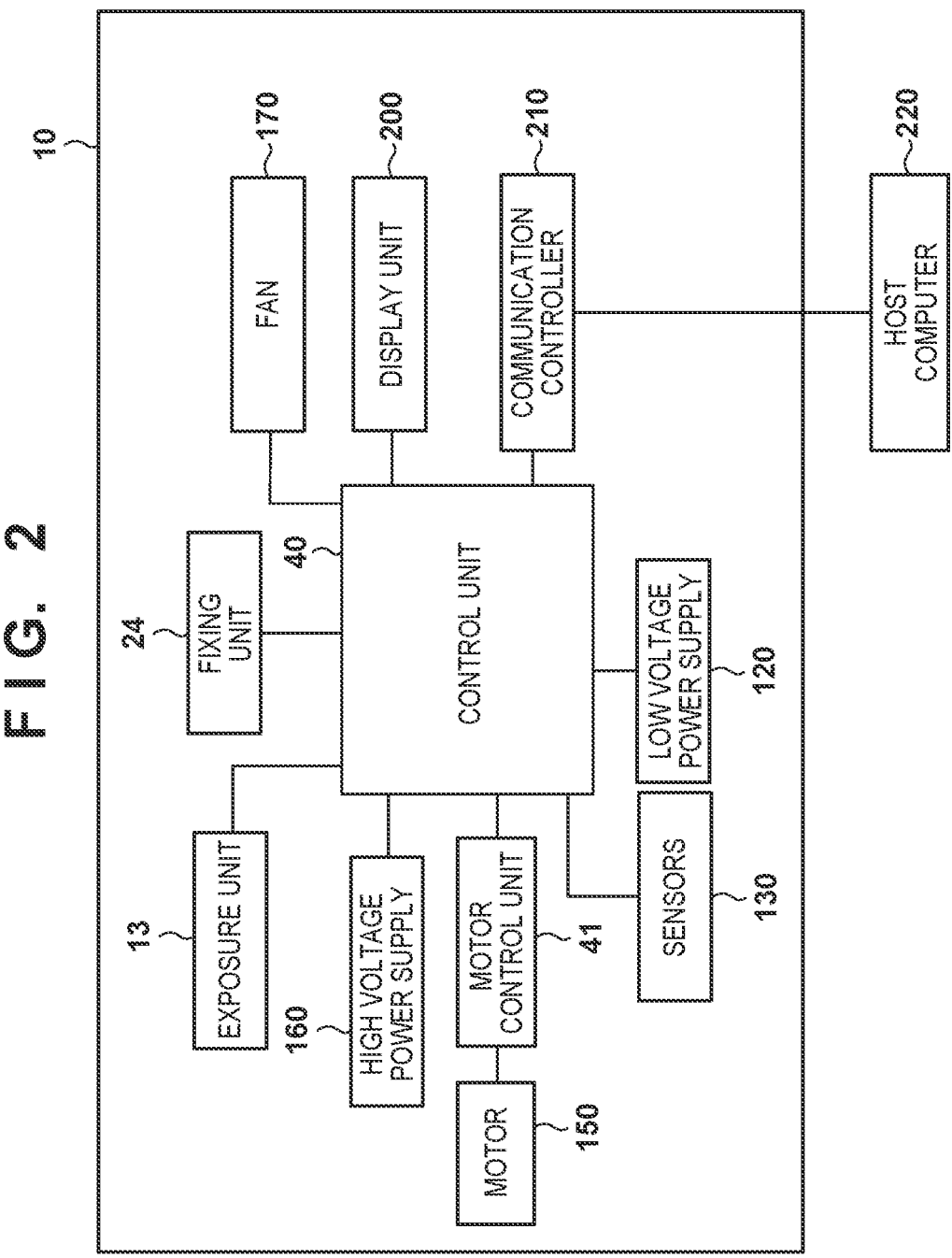
FIG. 2 is a block diagram for illustrating an example of a control configuration of the image forming apparatus.

FIG. 2 is a block diagram for illustrating an example of a control configuration of the image forming apparatus 10. As illustrated in FIG. 2, the image forming apparatus 10 further comprises a control unit 40, a low voltage power supply 120, sensors 130, a motor control unit 41, a high voltage power supply 160, a display unit 200, and a communication controller 210. The motor control unit 41 controls the motor 150 in accordance with an instruction from the control unit 40.

The control unit 40 includes a microcomputer, which uses a microprocessor as a CPU, and a memory. The microcomputer controls each device within the image forming apparatus 10 based on various control programs and various data stored in the memory. The sensors 130 are a plurality of sensors for detecting state of each device within the image forming apparatus 10 or state of the recording material P or the like.

The low voltage power supply 120 supplies power to each device within the image forming apparatus 10. The high voltage power supply 160 generates various bias voltages (for example, a charge bias voltage, a developing bias voltage, and a transfer bias voltage) necessary for image formation. The communication controller 210 communicates with an external apparatus such as a host computer 220. For example, the communication controller 210 receives data for printing from the host computer 220.

The control unit 40, when it receives image data of an image of a formation target from the host computer 220 via the communication controller 210, starts image formation for the recording material P based on the received image data. The control unit 40, when it starts image formation, controls the motor control unit 41 to rotationally drive the motor 150. By this, the control unit 40 performs drive control of a rotational member such as the photosensitive member 11, and conveyance control of the recording material P. The control unit 40 controls the exposure unit 13 so as to form an electrostatic latent image on the photosensitive member 11. The control unit 40 further controls the high voltage power supply 160 so as to output bias voltages for image formation to the charging unit 12, the developing roller 15, the primary transfer unit 16, and the secondary transfer unit 19. Also, the control unit 40 performs display control for displaying a screen such as a screen indicating state of the image forming apparatus 10 on the display unit 200, control of the sensors 130 for detecting states of the recording material P or the image forming apparatus 10, and control of rotation speed of the fan 170.

<Motor Control Unit>

Figure 3:
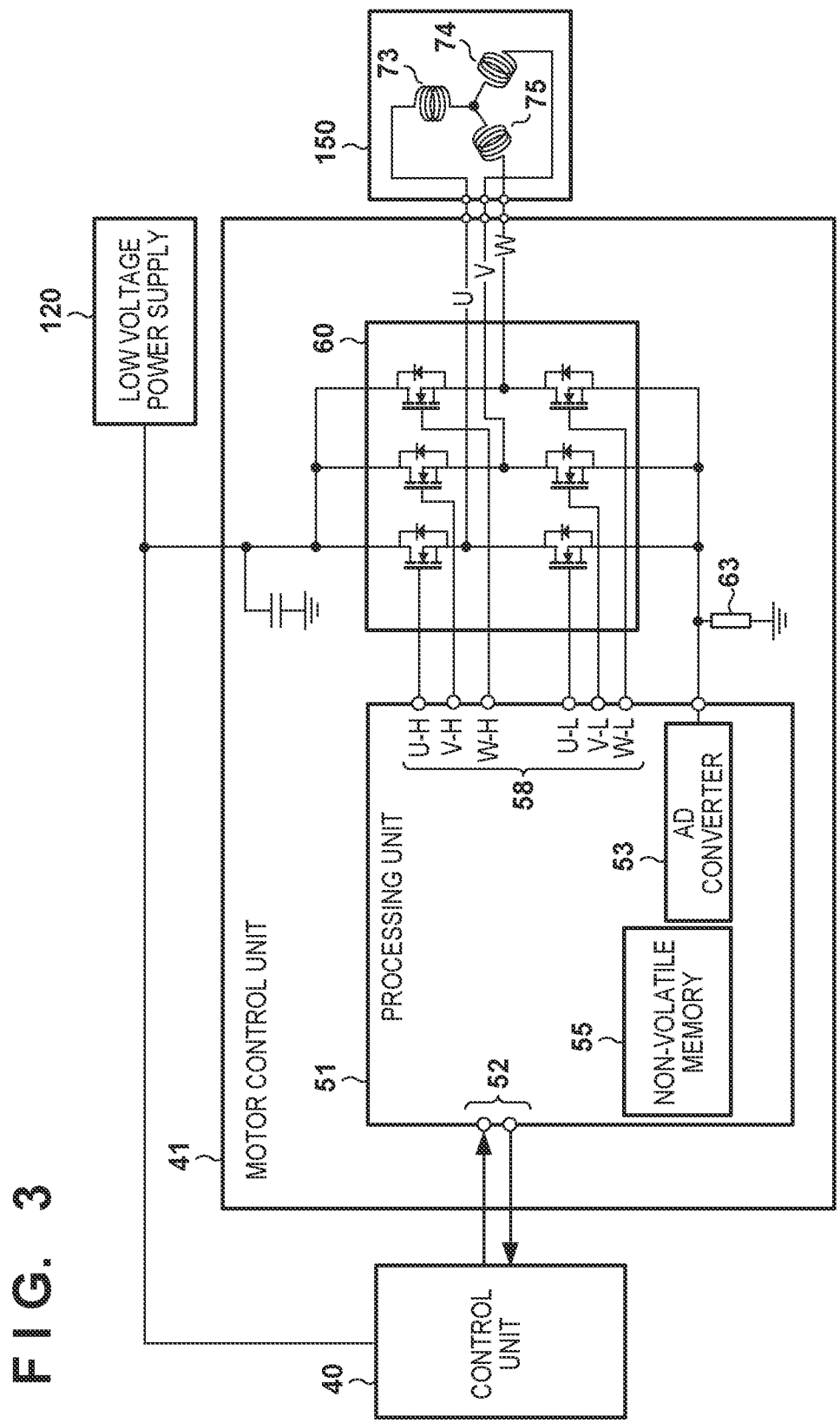
FIG. 3 is a block diagram for illustrating an example of a configuration of a motor control unit.

FIG. 3 illustrates an example of a configuration of the motor control unit 41. In the present embodiment, although the motor control unit 41 is arranged as one component of the image forming apparatus 10, it may be referred to as a motor control apparatus when it is configured as one apparatus. Also, an apparatus including the control unit 40 and the motor control unit 41 may be referred as a motor control apparatus.

The motor control unit 41 comprises a processing unit 51 and an inverter 60. The processing unit 51 can be realized by a microcomputer or the like. The processing unit 51 includes a communication port 52 and a pulse width modulation (PWM) port 58. The processing unit 51 performs serial data communication with the control unit 40 via the communication port 52. Also, the processing unit 51 outputs a PWM signal for driving each switching element of the inverter 60 via the PWM port 58.

The inverter 60 is connected to the motor 150 which is a target of control by the motor control unit 41. The motor 150 is a three-phase motor including three-phase (a U phase, a V phase, and a W phase) windings (coils) 73 to 75. The inverter 60 is a three-phase inverter configured by six switching elements that include three switching elements at a high-side respectively corresponding to the U phase, the V phase, and the W phase, and three switching elements at a high-side respectively corresponding to the U phase, the V phase, and the W phase. In other words, the inverter 60 comprises switching elements at a high-side and low-side connected to the coil 73 in the U phase, switching elements at a high-side and low-side connected to the coil 74 in the V phase, and switching elements at a high-side and low-side connected to the coil 75 in the W phase. Each switching element of the inverter 60 is, for example, configured by a transistor or a FET.

The PWM port 58 includes six terminals respectively corresponding to six switching elements of the inverter 60. In other words, the PWM port 58 includes terminals at the high-side and low-side corresponding to the U phase (a U-H terminal and a U-L terminal), terminals at the high-side and low-side corresponding to the V phase (a V-H terminal and a V-L terminal), and terminals at the high-side and low-side corresponding to the W phase (a W-H terminal and a W-L terminal).

The inverter 60 operates by receiving supply of direct-current voltage from the low voltage power supply 120. Each switching element of the inverter 60 can be driven by a PWM signal output from a corresponding terminal of the PWM port 58. By the PWM signal output from the PWM port 58, on and off of each switching element of the inverter 60 are controlled. By this, a current for excitation flows from the inverter 60 to the coil 73 (the U phase), the coil 74 (the V phase), and the coil 75 (the W phase) of the motor 150. The processing unit 51 controls current (exciting current) which flows to each of the coils 73 to 75 by controlling on and off of each switching element of the inverter 60. Accordingly, the inverter 60 functions as an excitation unit which excites a coil targeted for excitation among the plurality of coils 73 to 75 of the motor 150 (excites an excitation phase targeted for excitation among a plurality of excitation phases of the motor 150).

A resistor 63 is used for detecting the exciting current supplied to each of the coils 73 to 75. Specifically, the exciting current supplied to each of the coils 73 to 75 is converted to voltage by the resistor 63. Voltage after conversion is input to an AD converter 53 of the processing unit 51. The AD converter 53 converts the input voltage to a digital value by performing analog/digital (A/D) conversion with respect to the input voltage, and outputs the digital value as a value indicating a detection result of the exciting current. A non-volatile memory 55 functions as a holding unit which holds data or the like used for processing by the processing unit 51.

<Configuration of Motor>

Figure 4A:
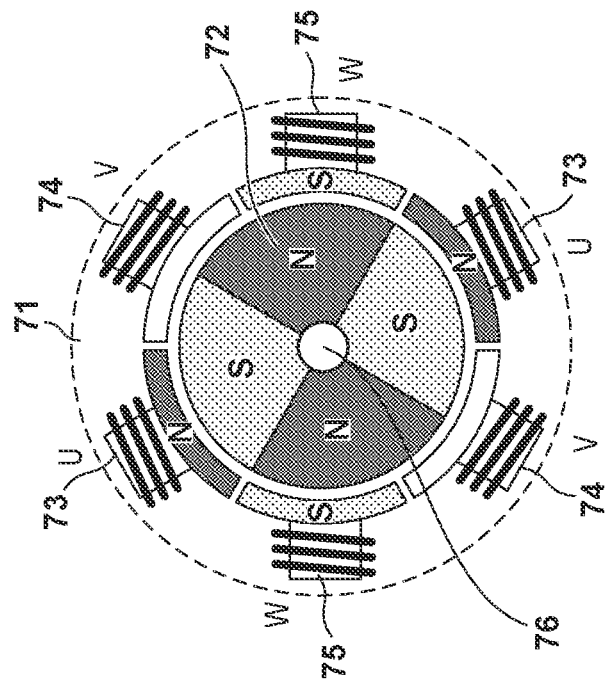
FIGS. 4A and 4B illustrate an example of a configuration of a motor.
Figure 4B:
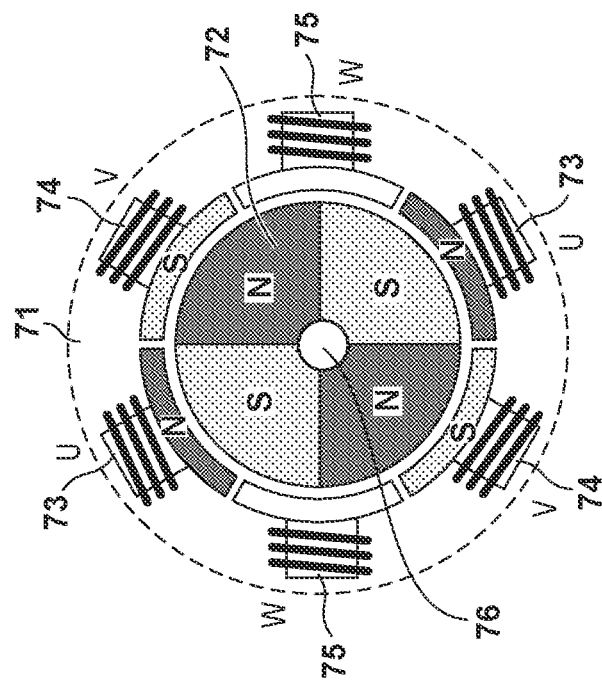

FIGS. 4A and 4B illustrate a specific example of a configuration of the motor 150. The motor 150 includes a stator 71 of six slots and rotors 72 of four poles. The stator 71 comprises the coil 73 in the U phase, the coil 74 in the V phase, and the coil 75 in the W phase as three-phase (the U phase, the V phase, and the W phase) coils, and the coils 73 to 75 are connected with a star connection. The coils 73 to 75 are respectively separated into two slots, and two slots of each coil are connected with, for example, a copper line (not illustrated) each other. The rotor 72 is configured by a permanent magnet and includes two pairs of N poles and S poles. The rotor 72 can rotate about a motor shaft 76.

In the present embodiment, there are total six excitation phases, U-V, U-W, V-U, V-W, W-U, and W-V, as combinations of excited coils among the coils 73 to 75 (in other words, excitation phases). Note that, in the present specification, for example, "excites the U-V phase" means that the inverter 60 is driven by the PWM signal output from the PWM port 58 such that the exciting current flows from a coil in the U phase to a coil in the V phase. Accordingly, the exciting current flows from the coil 73 in the U phase to the coil 74 in the V phase when exciting the U-V phase, and at this time, coils in the U phase become N poles and coils in the V phase become S poles.

Generally, the coils such as the coils 73 to 75 are configured by a copper wire wound around a core formed of laminated electromagnetic steel sheets. Also, the magnetic permeability of an electromagnetic steel sheet becomes small when an external magnetic field is present. The inductance of a coil is proportional to the magnetic permeability of a core, and therefore when the magnetic permeability of the core becomes small, the inductance of the coil also becomes small. Accordingly, the amount of decrease (the decrease rate) of inductance of coils influenced by an external magnetic field changes in accordance with the degree of influence of the external magnetic field. Specifically, the larger the degree of influence of the external magnetic field by the rotor 72, the larger the amount of decrease of the inductance of coils.

For example, in a case where the rotor 72 stops at the position illustrated in FIG. 4A, only the S poles of the rotor 72 oppose the coils 73 in the U phase, and both the S poles and the N poles (the middle portion between the S pole and the N pole) of the rotor 72 oppose the coils 75 in the W phase. In such a case, the influence of the external magnetic field by the rotor 72 is larger in the coils 73 in the U phase than in the coils 75 in the W phase. Accordingly, the amount of decrease in the inductance of the coils 73 in the U phase is larger than the amount of decrease in the inductance of the coils 75 in the W phase.

Also, the amount of change of the inductance of the coils 73 to 75 differs depending on whether the direction of the magnetic field occurring due to the exciting current flowing through the coils and the direction of the external magnetic field by the rotor 72 are the same or opposing. For example, in the state of FIG. 4A, in a case where the exciting current flowed in the direction in which the U phase becomes the N pole, the amount of decrease in the inductance of the coils 73 becomes larger than in the case where the exciting current flowed such that the U phase becomes the S pole. Note that, when the direction of the magnetic field which occurred due to the exciting current flowing through a certain coil and the direction of the external magnetic field due to the rotor 72 become the same direction, such as with the coils 73 in FIG. 4A, the amount of decrease of the inductance of the coil becomes greatest.

Accordingly, in a case where the motor 150 stops, the inductance of each of the coils 73 to 75 changes and the combined inductance for a combination of multiple coils also changes, in accordance with the stop position (rotational phase) and the excitation phase of the rotor 72. Note that, in the present specification, "the combined inductance of the U-V phase" is assumed to mean "the combined inductance of the coils 73 in the U phase and the coils 74 in the V phase in a case where the current flowed such that the U phase is to be the N pole and the V phase is to be the S pole".

Also, at a time of stopping the motor 150, the position at which the rotor 72 stops (rotational phase) is determined in accordance with the combination of the excited coils (in other words, the excitation phase) among the coils 73 to 75. For example, when exciting the U-V phase, the exciting current flows from the coil 73 in the U phase to the coil 74 in the V phase, and the coil 73 in the U phase becomes the N pole and the coil 74 in the V phase becomes the S pole. By this, the rotor 72 stops at the position illustrated in FIG. 4A. Next, when exciting the U-W phase, the exciting current flows from the coil 73 in the U phase to the coil 75 in the W phase, and the coil 73 in the U phase becomes the N pole and the coil 75 in the W phase becomes the S pole. By this, the rotor 72 stops at the position illustrated in FIG. 4B.

<Estimation of the Temperature of the Motor (Rotor)>

In the present embodiment, description is given regarding an example in which, in order to appropriately perform control of the motor 150 even if the temperature of the motor 150 (rotor 72) changes, the temperature of the motor 150 (rotor 72) is estimated and the motor 150 is controlled based on the estimated temperature when the motor 150 is in a stopped state. As described later, the motor has a characteristic in which the inductance of a coil changes in accordance with a temperature change of the rotor.

Here, the external magnetic field due to the rotor 72 is mainly provided by a magnetic path formed by a magnet used in the rotor 72, a metal configuring the rotor 72, an electromagnetic steel plate around which a coil is wound, and the like. The material of the magnet used in the rotor 72 is, for example, ferrite, neodymium, or the like. A ferrite magnet has a characteristic in which demagnetization occurs at a rate of −0.18% per a 1° C. rise in temperature. A neodymium magnet has a characteristic in which demagnetization occurs at a rate of −0.12% per a 1° C. rise in temperature.

Accordingly, when the temperature of the rotor 72 changes, the influence of the external magnetic field due to the rotor 72 on the coils 73 to 75 changes. When the influence of the external magnetic field changes, a change in the amount of decrease of the inductance of the coils 73 to 75 occurs. In other words, when the temperature of the rotor 72 changes, the amount of decrease (decrease rate) of the inductance of the coils 73 to 75 due to the influence of the external magnetic field changes (specifically, a change in the inductance of the coils 73 to 75 occurs). For example, when the temperature of the rotor 72 rises, the magnets of the rotor 72 demagnetize and the influence (intensity) of the external magnetic field due to the rotor 72 becomes small. As a result, the amount of decrease of the inductance of the coils 73 to 75 due to the influence of the external magnetic field becomes small.

In the present example, by utilizing the characteristics of such a motor, a physical quantity that changes in accordance with the inductance of the coils 73 to 75 is measured when the motor 150 is in the stopped state and the temperature of the rotor 72 is estimated based on the measurement result. Specifically, the processing unit 51, in a state in which the motor 150 is stopped, excites the excitation phase corresponding to the stop position of the rotor 72 among the plurality of excitation phases and measures the physical quantity that changes in accordance with the inductance of at least one of the coils 73 to 75. Furthermore, the control unit 40 estimates the temperature of the rotor 72 from the measurement value of the physical quantity measured by the processing unit 51 and decides (changes) a parameter value for control of the motor 150 based on the obtained estimated temperature.

Hereinafter, description is given regarding a specific method for estimating the temperature of the rotor 72. Here, an example where the U-V phase of the motor 150 is excited and an estimation of the temperature of the rotor 72 is performed in a state in which the rotor 72 was stopped at the position illustrated in FIG. 4A is described.

FIGS. 5A and 5B illustrate an example of a relationship between an exciting current flowing through the coils 73 to 75 and the temperature of the rotor 72 of the motor 150. In the present example, in a state in which the rotor 72 has stopped at a position (the position illustrated FIG. 4A) corresponding the U-V phase, the processing unit 51 excites the U-V phase over a period (A period and B period are shown in FIG. 5A) and measures an exciting current Iuv which flows from the coil 73 in the U phase to the coil 74 in the V phase. FIG. 5A illustrates an example of a temporal change of the exciting current Iuv obtained by the measurement. The exciting current Iuv is detected by using the resistor 63 and the AD converter 53 as described above. In FIG. 5A, the solid line illustrates a temporal change of the measurement value of the exciting current Iuv in a case where a temperature T of the magnet of the rotor 72 is low (T=T1L), and the dashed line illustrates a temporal change of the measurement value of the exciting current Iuv in a case where the temperature T of the magnet of the rotor 72 is high (T=T1H, T1H>T1L). Note, in the present example, T1L=20 [° C.] and T1H=80 [° C.].

In the present example, the processing unit 51 excites the U-V phase by driving the inverter 60, as follows, by the PWM signal output from the PWM port 58 (in other words, causes the exciting current to flow from the coils 73 in the U phase to the coils 74 in the V phase). Firstly, in the A period (first period), a duty ratio of the PWM signal to be output from the U-H terminal of the PWM port 58 is set to be 50%. Furthermore, in a case where the output voltage of the U-H terminal is a high (H) level, the output voltage of the U-L terminal is set to be a low (L) level, and in a case where the output voltage of the U-H terminal is an L-level, the output voltage of the U-L terminal is set to be an H-level. Also, in the A period, the output voltage of the V-L terminal is set to be an H-level (i.e., the duty ratio of the PWM signal to be outputted is 100%) and the output voltage of another terminal is an L-level (i.e., the duty ratio of the PWM signal to be outputted is 0%).

In the B period (second period) which follows the A period, a duty ratio of the PWM signal to be output from the V-H terminal of the PWM port 58 is set to be 50%. Furthermore, in a case where the output voltage of the V-H terminal is a high (H) level, the output voltage of the V-L terminal is set to be a low (L) level, and in a case where the output voltage of the V-H terminal is an L-level, the output voltage of the V-L terminal is set to be an H-level. Also, in the B period, the output voltage of the U-L terminal is set to be an H-level (i.e., the duty ratio of the PWM signal to be outputted is 100%) and the output voltage of another terminal is set to be an L-level (i.e., the duty ratio of the PWM signal to be outputted is 0%). Note that, for the time length of the A period and the B period, the length of the period during which the rotor 72 continues to be stopped in a case where the motor 150 is excited in a state in which the rotor 72 has been stopped is set to be an upper limit, and the time length of the A period and the B period is specified based on a detection accuracy of the exciting current (of the peak value) that is necessary. In the present example, the time length of the A period and the B period is 0.5 ms each.

By the processing unit 51 driving the inverter 60 by the PWM signal outputted from the PWM port 58 as described above, the exciting current increases in the A period and, after reaching a peak value IuvpL or IuvpH, decreases in the B period as illustrated in FIG. 5A. Also, in the A period and B period, the current Iuv changes in a curved line shape, not in a straight line shape. This is because the combined inductance of the U-V phase changes according to the magnitude of the exciting current Iuv during a period in which the duty ratio of the PWM signal output from the PWM port 58 is fixed. For example, in FIG. 5A, the combined inductance of the U-V phase becomes small in accordance with the increase of the exciting current Iuv, and as a result, the slope of the current Iuv becomes sharper.

In FIG. 5A, in a case where the temperature T of the rotor 72 is low (T=T1L), the peak value Iuvp of the exciting current Iuv is IuvpL, as illustrated by the solid line. Meanwhile, in a case where the temperature T of the rotor 72 is high (T=T1H), the peak value Iuvp of the exciting current Iuv is IuvpH, which is lower than in the case of T=T1L, as illustrated by the dashed line.

FIG. 5B illustrates an example of a change of the peak value Iuvp of the exciting current Iuv in relation to a change of the temperature T of such a rotor 72. As illustrated in FIG. 5B, w % ben the temperature T of the rotor 72 rises, the peak value Iuvp of the exciting current Iuv becomes small. This is because, when the temperature of the rotor 72 rises, the amount of decrease of the inductance of the coils 73 to 75 due to the influence of the external magnetic field becomes small and thus the peak value Iuvp of the exciting current Iuv also becomes small, as described above. Note that the characteristic illustrated in FIGS. 5A and 5B is a characteristic of a case where the position of the rotor 72 is fixed, and when the position of the rotor 72 changes, the inductance and the combined inductance of each coil also changes.

As described above, the higher the temperature T of the rotor 72, the smaller the peak value Iuvp of the exciting current Iuv. Accordingly, in the present embodiment, the control unit 40 estimates the temperature of the rotor 72 as described above, by utilizing the characteristic of such a motor 150. For example, the processing unit 51 excites, by using the inverter 60, the excitation phase (U-V phase) corresponding to the stop position of the rotor 72, in a state in which the rotor 72 is stopped at a position corresponding to the U-V phase (the position illustrated in FIG. 4A). Here, the excitation phase corresponding to the stop position of the rotor 72, which is to be excited by the inverter 60, is the excitation phase, among the plurality of excitation phases, whose amount of decrease in the inductance of the excitation phase due to the influence of the external magnetic field (decrease rate) is larger than any other excitation phase in correspondence with the stop position. Furthermore, the processing unit 51 measures, as the physical quantity that changes in accordance with the inductance (the combined inductance of the U-V phase, for example) of at least one of the coils 73 to 75, the peak value of the exciting current Iuv which flows through the coils 73 and 74 that configure the U-V phase. After this, the control unit 40 estimates the temperature of the rotor 72 from the peak value Iuvp of the exciting current Iuv, which was measured by the processing unit 51.

For the estimation of the temperature of the rotor 72 by the control unit 40, for example, as shown in FIG. 5B, information indicating the correspondence between the peak value Iuvp of the exciting current Iuv and the temperature T of the rotor 72 is obtained in advance, and the estimation is performed based on such information. In such a case, the information indicating the correspondence described above is stored in advance to a non-volatile memory within the control unit 40. The control unit 40 obtains the temperature corresponding to the measured peak value Iuvp as an estimated temperature of the rotor 72 based on the information stored in the non-volatile memory.

Note that the information stored in the non-volatile memory within the control unit 40 as described above may be information indicating a numerical value table or may be information indicating an approximation curve, for example. In a case where a numerical value table (specifically, information indicating a discrete value) is used, a method of referencing a value closest to the measured peak value Iuvp among the values stored in the non-volatile memory may be used, and a method of interpolating between a plurality of values may be used.

<Processing Procedure>

FIG. 6 is a flowchart illustrating a processing procedure by the control unit 40 according to the present embodiment. The present procedure illustrates an example in which the control unit 40 estimates the temperature of the rotor 72 and decides, based on the estimated temperature, a target speed of the motor 150, which is a target value of the rotation speed of the rotor 72, as a parameter value for control of the motor 150. In the present example, similar to the example described above, a case in which the rotor 72 is stopped at the position (the position corresponding to the U-V phase) illustrated in FIG. 4A and an estimation of the temperature of the rotor 72 is performed is illustrated.

Firstly, in step S101, the control unit 40 controls the motor control unit 41 to excite a predetermined excitation phase (the U-V phase in the present example) so that the rotor 72 stops at the predetermined position. Specifically, the control unit 40 controls the motor control unit 41 to excite the U-V phase of the motor 150 by outputting, from the PWM port 58, a PWM signal of a predetermined pattern for a predetermined time (several hundred milliseconds, for example) thereby driving the inverter 60. By this, the rotor 72 moves to a predetermined position (a stop position corresponding to the U-V phase) at which the influence of the external magnetic field exerted on the U-V phase is strongest. At this time, the amount of decrease of the combined inductance of the U-V phase becomes largest.

Next, in step S102, the control unit 40 controls the motor control unit 41 to output, from the PWM port 58, a PWM signal of a pattern for measuring of the peak value Iuvp of the exciting current Iuv which flows through the coils 73 and 74 configuring the U-V phase, thereby driving the inverter 60. By this, the motor control unit 41 measures the peak value Iuvp of the exciting current Iuv as described above.

Accordingly, the motor control unit 41 (processing unit 51) drives the inverter 60 so that the rotor 72 stops at a position corresponding to a predetermined excitation phase prior to a start of a measurement of the peak value Iuvp of the exciting current Iuv (the physical quantity that changes in accordance with the inductance of the coil). Furthermore, the motor control unit 41 (processing unit 51) starts the measurement of the peak value Iuvp (physical quantity) after the stopping of the rotor 72.

When the measurement of step S102 is completed, in step S103, the control unit 40 estimates the temperature T of the rotor 72 based on the peak value Iuvp of the exciting current Iuv, measured by the motor control unit 41, as described above. After this, in steps S104 to S106, the control unit 40 performs processing for deciding the target speed of the motor 150 based on the estimated temperature of the rotor 72.

Specifically, in step S104, the control unit 40 determines whether or not the estimated temperature of the rotor 72 is equal to or less than a predetermined threshold (for example, 60° C.). The control unit 40, in a case where the estimated temperature is equal to or less than the threshold, advances the processing from step S104 to step S105 and decides the target speed of the motor 150 to be a first speed V1. On the other hand, the control unit 40, in a case where the estimated temperature exceeds the threshold, advances the processing from step S104 to step S106 and decides the target speed of the motor 150 to be a second speed V2 (<V1) which is lower than the first speed V1. After the processing of step S105 or step S106, the control unit 40 activates the motor 150 and the processing ends in step S107.

Figure 7A:
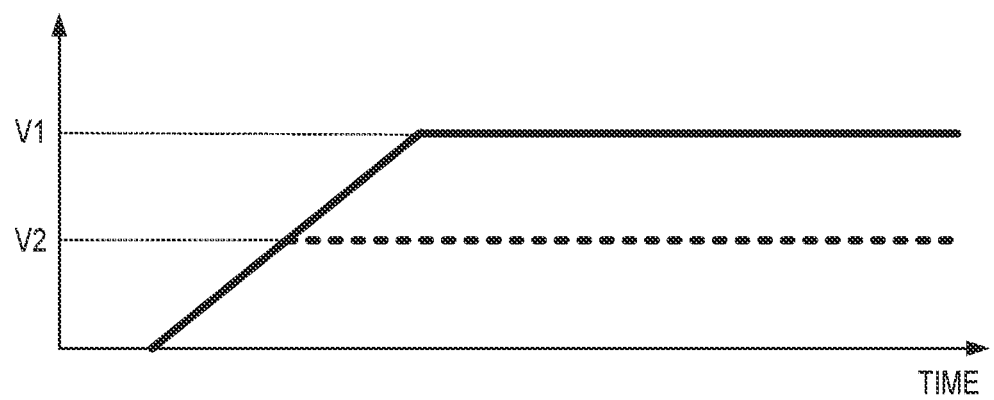
FIGS. 7A and 7B illustrate an example of temporal change of a rotation speed of the motor.

FIG. 7A illustrates an example of a temporal change of the rotation speed of the motor 150 (rotor 72) and illustrates an example of control of the motor 150 based on the procedure of FIG. 6. In the present example, the target speed of the motor 150 is made variable between V1 and V2 based on the estimated temperature of the rotor 72 for the following reason. As described above, when the temperature of the magnet of the rotor 72 becomes high, the magnet demagnetizes. As a result, mechanical output of the motor 150 becomes small compared to a case where the temperature of the magnet of the rotor 72 is low. In this way, when the mechanical output of the motor 150 becomes small (when output decrease occurs), the motor 150 may not reach the target speed, or the rotation speed of the rotor 72 may drop abnormally when the load torque fluctuates, for example. In the image forming apparatus 10, if the rotation speed of the motor 150 during execution of image formation changes, this leads to a decrease in image formation quality.

Accordingly, in the present embodiment, the control unit 40 decides the target speed of the motor 150 based on the estimated temperature of the rotor 72 in order to prevent the above described malfunction of the operation of the motor 150 from occurring due to the temperature rise of the rotor 72. In other words, the control unit 40 lowers the target speed of the motor 150 as the estimated temperature of the rotor 72 increases. In the example of control based on the procedure of FIG. 6, in a case where the estimated temperature of the rotor 72 is low (equal to or less than the threshold), the target speed of the motor 150 is decided to be the high speed V1, as illustrated by the solid line in FIG. 7A, and the motor 150 is activated. On the other hand, in a case where the estimated temperature of the rotor 72 is high (exceeds the threshold), the target speed of the motor 150 is decided to be the low speed V2, as illustrated by the dashed line in FIG. 7A, and the motor 150 is activated. It is possible to decrease the influence of a decrease in output of the motor 150, which occurs due to a rise in temperature of the rotor 72, by activating the motor 150 and controlling the motor 150 by using the decided target speed.

As described above, in the present embodiment, the processing unit 51, in a state where the motor 150 is stopped, excites the excitation phase corresponding to the stop position of the rotor 72 and measures the physical quantity that changes in accordance with the inductance of at least one of the coils 73 to 75. Furthermore, the control unit 40 estimates the temperature of the rotor 72 from the measurement value (for example, the peak value of the exciting current) of the physical quantity measured by the processing unit 51 and decides (changes) a parameter value for control of the motor 150 based on the obtained estimated temperature.

By virtue of the present embodiment, the temperature of the rotor 72 can be estimated when the motor 150 is in a stopped state. By this, it becomes possible to more appropriately perform control of the motor 150 even if the temperature of the motor 150 (rotor 72) changes. Also, it becomes possible to perform control of the motor 150 in accordance with the estimated temperature of the rotor 72 without a temperature sensor being included in the image forming apparatus 10.

<Variation>

The present embodiment can be modified in various ways as described below.

Example 1

Figure 7B:
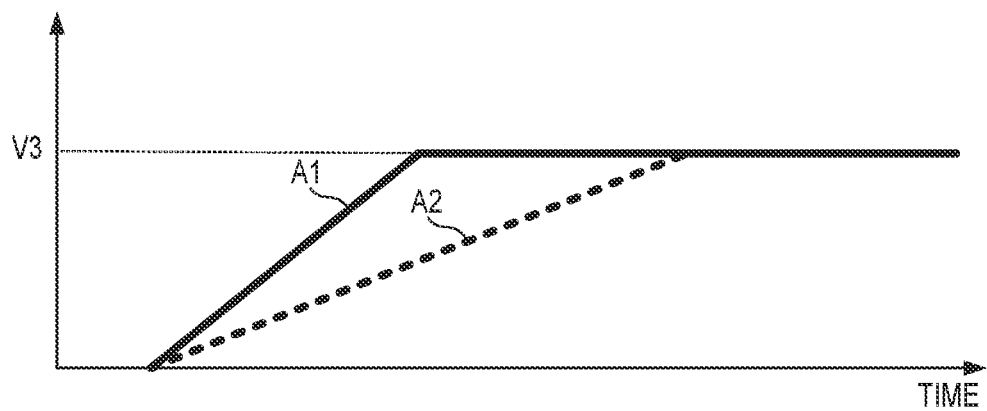

Based on the estimated temperature of the rotor 72, the acceleration of the motor 150 (rotor 72) may be decided (changed) as a parameter value for control of the motor. FIG. 7B illustrates an example of a temporal change of the rotation speed of the motor 150 (rotor 72) and illustrates an example of control of the motor 150 in a case where the target speed is fixed at V3 and the acceleration of the motor 150 is decided based on the estimated temperature of the rotor 72.

Generally, at a time of activation (time of acceleration) of the motor 150, a large mechanical output is required in order to accelerate the rotor 72. In a case where the temperature of the rotor 72 is high, it is necessary to supply a large current to the motor 150 as an exciting current in order to obtain the same mechanical output, compared to a case where the temperature is low. However, because the magnitude of the current that can be supplied to the motor 150 is limited by the capacity of the low voltage power supply 120, a voltage reduction or an abnormal stop of the low voltage power supply 120 may occur when an excessively large current is supplied.

Accordingly, in a case where the temperature of the rotor 72 is low, the acceleration of the rotor 72 is decided to be A1, as illustrated by the solid line in FIG. 7B, and the motor 150 is activated. On the other hand, in a case where the temperature of the rotor 72 is high, the acceleration of the rotor 72 is decided (changed) to be A2, as illustrated by the dashed line in FIG. 7B, and the motor 150 is activated. Specifically, the control unit 40 lowers the acceleration of the rotor 72 as the estimated temperature of the rotor 72 increases. In the example of FIG. 7B, the control unit 40 decides the acceleration of the rotor 72 to be the first acceleration A1 in a case where the estimated temperature is equal to or less than a threshold, and decides the acceleration of the rotor 72 to be the second acceleration A2 which is lower than A1 in a case where the estimated temperature is not equal to or less than the threshold.

Accordingly, in a case where the temperature of the rotor 72 is high, by reducing the acceleration of the rotor 72, the current that the low voltage power supply 120 needs to supply to the motor 150 can be reduced. In other words, by changing the acceleration of the rotor 72 in accordance with the temperature of the magnet of the rotor 72, it becomes possible to, even if the temperature of the motor 150 (rotor 72) is changed, accelerate the motor 150 up to a predetermined target speed without increasing the capacity of the low voltage power supply 120.

Example 2

The pattern of the PWM signal for the inverter 60 to excite each excitation phase can be set to an arbitrary pattern such as a rectangular wave, a triangular wave, a sinusoidal wave, or trapezoidal wave, for example. Also, in the measurement by the processing unit 51, a pattern in which three phases of U phase, V phase, and W phase are simultaneously excited may be used.

Example 3

In the present embodiment, description regarding an example in which a peak value of the exciting current which flows through a coil configuring the excitation phase of excitation target is measured as a physical quantity which changes in accordance with the inductance of at least one of the coils 73 to 75 is given. However, the measured physical quantity is not limited to the peak value of the exciting current and may be something which changes in accordance with a change of the inductance of a coil. For example, the measured physical quantity may be a physical quantity such as a current value, integral value, or amounts of change of an exciting current for a predetermined time. Alternatively, the measured physical quantity may be a rising time or falling time (in other words, the quickness of rising or falling) of the exciting current which flows through a coil configuring the excitation phase of the excitation target. The rising time and falling time of the exciting current becomes shorter the larger the change of the inductance of a coil is. Accordingly, the rising time and falling time of the exciting current can be used as a physical quantity which changes in accordance with the inductance of a coil.

Figure 8A:
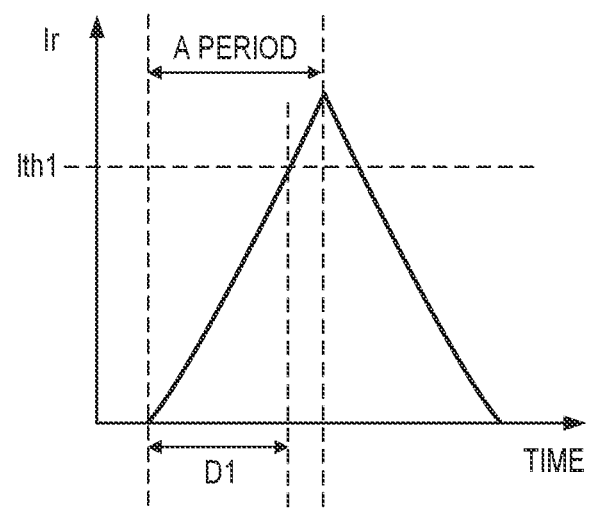
FIGS. 8A to 8C illustrate an example of a measurement method of a rising time or a falling time of an exciting current.
Figure 8B:
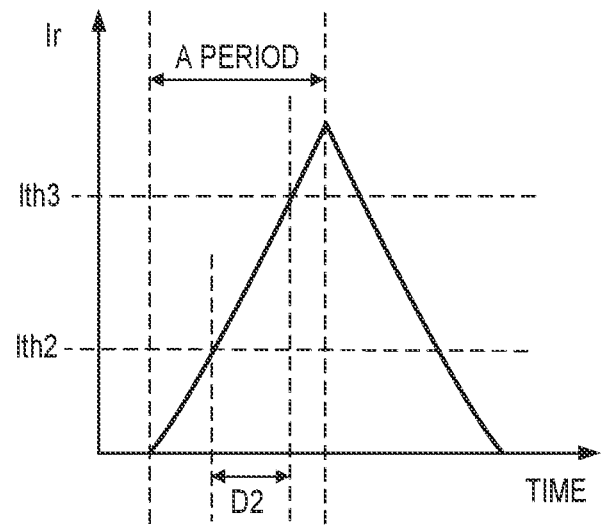
Figure 8C:
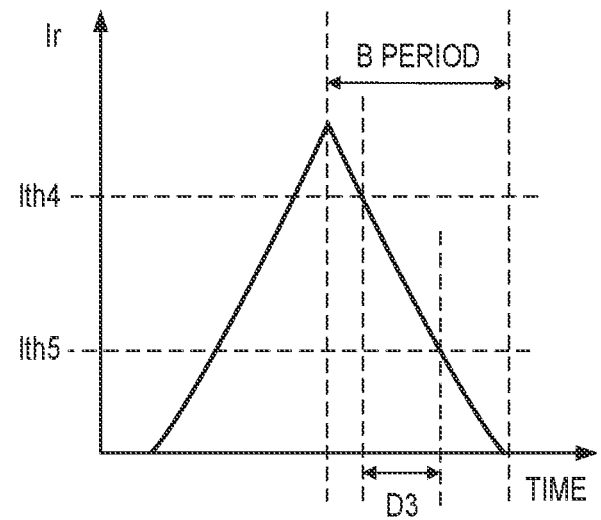

FIGS. 8A to 8C illustrate an example of a measurement (detection) method of a rising time or a falling time of an exciting current, as described above. As illustrated in FIG. 8A, the rising time of the exciting current can be measured as a time D1 from the timing when the output of the PWM signal from the PWM port 58 is started in the A period to the timing when the current value of the exciting current Ir reaches a predetermined threshold Ith1. Alternatively, as illustrated in FIG. 8B, the rising time of the exciting current can be measured as a time D2 from the timing when the current value of the exciting current Ir reaches a predetermined threshold Ith2 in the A period to the timing when the current value reaches a predetermined threshold Ith3 (>Ith2). Also, as illustrated in FIG. 8C, the falling time of the exciting current can be measured as a time D3 from the timing when the current value of the exciting current Ir reaches a predetermined threshold Ith4 in the B period to the timing when the current value reaches a predetermined threshold Ith5 (<Ith4).

Example 4

In the present embodiment, description regarding information, used in the estimation of the temperature of the rotor 72 by the control unit 40, is stored in advance in a non-volatile memory within the control unit 40 is given. In a case where there are large variations in manufacturing, such as part tolerances, of the motor 150 used in the image forming apparatus 10, information indicating the correspondence between the peak value of the exciting current and the temperature of the rotor 72 for the motor actually used may be obtained by measurement and stored in the non-volatile memory. Alternatively, the peak value of the exciting current may be measured as described above under the condition that the temperature of the motor 150 is equivalent to room temperature (ambient temperature) and the information stored in the non-volatile memory may be corrected based on the measurement result.

Example 5

In the present embodiment, in the processing procedure described with reference to FIG. 6, the excitation phase of the excitation target is excited (step S101) such that the rotor 72 will stop at a predetermined position prior to performing measurement (step S102) of the peak value of the exciting current. However, the processing of step S101 does not necessarily have to be executed immediately prior to the processing of step S102. Also, in place of the processing of step S101, the position of the rotor 72 may be controlled such that the rotor 72 stops at a predetermined position when stopping the rotating rotor 72, in preparation for the measurement of the peak value of the exciting current (step S102).

Example 6

The estimated temperature of the rotor 72 may be used for controlling another device within the image forming apparatus 10 in addition to being used for deciding (changing) the parameter value for control of the motor 150. For example, the estimated temperature of the rotor 72 may be used for controlling the rotation frequency of the fan 170 in order to cool the motor 150 in the present embodiment. In such a case, the control unit 40, in a case where the estimated temperature of the rotor 72 exceeds a predetermined threshold (60° C. for example), may control the rotation frequency of the fan 170 so as to cause the rotation frequency of the fan 170 to increase, and may activate the motor 150. In other words, in a case where the temperature of the rotor 72 is estimated to be high, the motor 150 is activated while the rotation speed of the fan 170 is increased to cool the motor 150. By this, it becomes possible to suppress a rise in temperature of the motor 150 and appropriately perform control of the motor 150. Note that the device targeted for cooling by the fan 170 is not limited to the motor 150 and may be another device in which the temperature rises in accordance with a rise in temperature of the rotor 72, for example.

Example 7

In the present embodiment, an example in which the temperature of the rotor 72 is estimated and a parameter value (target speed) for control of the motor 150 is changed based on the estimated temperature is described. However, by understanding in advance the relationship between the measurement value of the physical quantity and the parameter value (target speed) to be decided (changed) with respect to the measurement value, it is also possible to directly obtain the parameter value (target speed) from the measurement value of the physical quantity without performing estimation of the temperature of the rotor 72. In such a case, the control unit 40 decides, based on a physical quantity measured by the processing unit 51, the parameter value for control of the motor 150 by obtaining the parameter value associated in advance with the physical quantity, for example.

Second Embodiment

Next, a second embodiment is described. In the second embodiment, estimation of a stop position of the rotor 72 and estimation of the temperature of the rotor 72 is performed, in a state where the rotor 72 of the motor 150 is stopped, based on a measurement result of a physical quantity when each excitation phase is excited. Hereinafter, description regarding portions in common with the first embodiment is omitted.

<Estimation of Rotor Stop Position>

The motor control unit 41 excites the plurality of excitation phases (U-V phase, U-W phase, V-U phase, V-W phase, W-U phase, and W-V phase) of the motor 150 in order respectively, and measures a physical quantity when each excitation phase is excited. The measured physical quantity is a physical quantity changed in accordance with the inductance of at least one of the plurality of coils 73 to 75 configuring the plurality of excitation phases. In the present embodiment, similar to the first embodiment, description regarding an example where the peak value of the exciting current is measured as the physical quantity is given. The control unit 40, based on a plurality of measurement values, that are obtained by measurement by the motor control unit 41 and that correspond to respective excitation phases, estimates (detects) the stop position of the rotor 72 (by determining a magnitude relationship between the measurement values, for example).

Figure 9A:
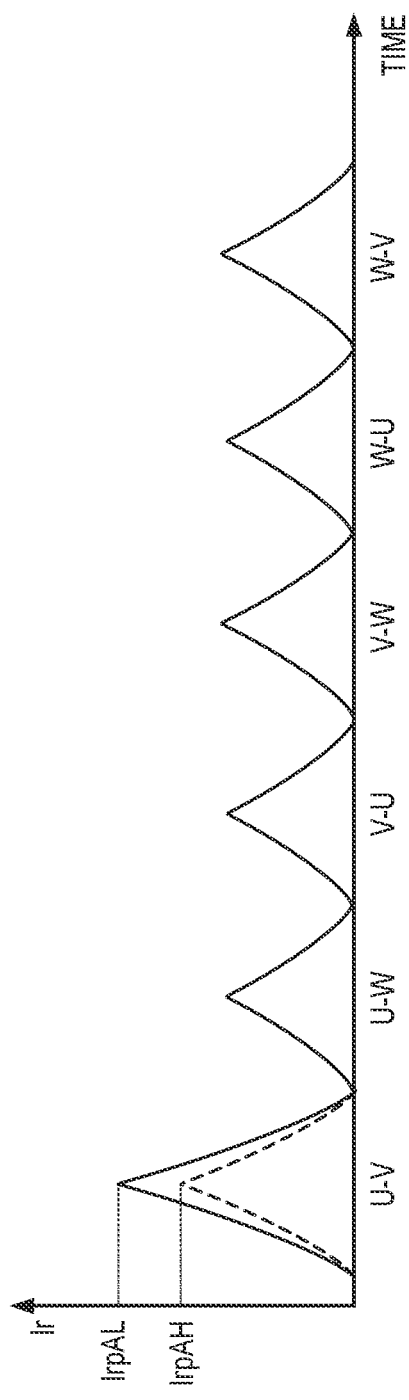
FIGS. 9A to 9D illustrate an example of a combined inductance corresponding to a measurement value and each excitation phase of the exciting current when a plurality of excitation phases are excited in order.

FIG. 9A illustrates an example of a temporal change of the exciting current Ir measured by the processing unit 51 in a case where the plurality of excitation phases are excited in order. The exciting current Ir is detected by using the resistor 63 and the AD converter 53 as described above. As illustrated in FIG. 9A, the current Ir changes not in a straight line shape but in a curved line shape, even if the duty ratio of the PWM signal outputted from the PWM port 58 to the inverter 60 may be fixed. This is because the combined inductance of the excitation phases targeted to be excited changes in accordance with the magnitude of the exciting current Ir.

The processing unit 51 detects the peak value of the exciting current Ir measured when each excitation phase is excited.

Figure 9B:
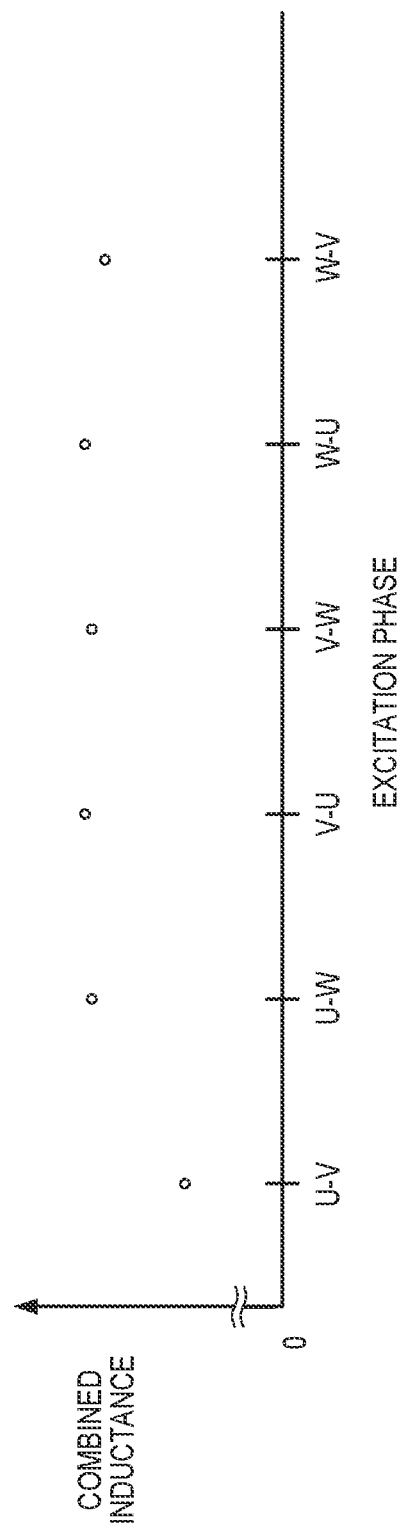

FIG. 9B illustrates an example of a combined inductance of each excitation phase obtained from the peak value of the exciting current Ir illustrated in FIG. 9A. As illustrated in FIG. 9B, the larger the peak value of the exciting current Ir obtained in a case where each excitation phase is excited using the PWM signal of the same pattern, the larger the amount of decrease in the combined inductance becomes. Also, as described above, the larger influence of the external magnetic field becomes, the larger the amount of decrease of the combined inductance of each the excitation phase due to the influence of the external magnetic field becomes.

In FIG. 9A, the peak value of the exciting current Ir corresponding to the U-V phase is the maximum among the six excitation phases. Corresponding to this, in FIG. 9B, the combined inductance of the U-V phase is the minimum. This indicates that the rotor 72 is located at the position where the influence of the external magnetic field is greatest for the U-V phase among the six excitation phases. In other words, the rotor 72 is positioned (the position illustrated in FIG. 4A) where the rotor 72 will stop in a case where the U-V phase is excited.

Therefore, the position (stop position) of the rotor 72 can be estimated by comparing the measurement values of the peak values of the exciting current Jr corresponding to the plurality of excitation phases and determining the measurement value indicating the maximum peak value. In other words, the measurement values of the physical quantities corresponding to the plurality of excitation phases which change according to the inductances of the coils are compared, and the measurement value indicating that the inductance of the coils configuring the corresponding excitation phase is the minimum is determined. Furthermore, the stop position of the rotor 72 can be estimated by determining the position at which the rotor 72 will stop in a case where the excitation phase corresponding to the measurement value is excited, to be the stop position.

As described in the first embodiment, the amount of change (reduction amount) of the inductance of the coils 73 to 75 due to the influence of an external magnetic field changes in accordance with the change of the temperature of the magnets of the rotor 72. In FIG. 9A, the solid line indicates the measurement result, corresponding to each exciting phase, of the peak value of the exciting current Ir in a case where the temperature of the magnets of the rotor 72 is low. Also, the dashed line indicates the measurement result, corresponding to each exciting phase, of the peak value of the exciting current Ir in a case where the temperature of the magnets of the rotor 72 is high.

In FIG. 9A, in a case where the temperature of the magnets of the rotor 72 is high, the peak value IrpAH of the exciting current Ir corresponding to the U-V phase becomes lower than the peak value IrpAL in a case where the temperature of the magnets of the rotor 72 is low. This indicates that, as a result of the magnets demagnetizing when the temperature of the magnets of the rotor 72 becomes high and the amount of decrease of combined inductance of the U-V phase due to the influence of an external magnetic field becoming small, the peak value of the exciting current Ir becomes low. On the other hand, regarding the five excitation phases other than the U-V phase, even if the temperature of the rotor 72 changes, a change of the combined inductance (or the peak value of the exciting current Ir) of the excitation phases hardly occurs (in FIG. 9A, the solid line and the dashed line mostly overlap).

This is because the influence of an external magnetic field due to the rotor 72 is originally small.

In FIG. 9A, even in a state where the temperature of the magnets of the rotor 72 is high, the peak value IrpAH of the exciting current Ir corresponding to the U-V phase is larger than the peak values corresponding to the five excitation phases other than the U-V phase. Accordingly, even in a state where the temperature of the magnets of the rotor 72 is high, the position (stop position) of the rotor 72 can be estimated based on the measurement result of the peak values of the exciting current Ir corresponding to respective excitation phases.

As described above, the combined inductance of each excitation phase changes when the position (rotational phase) of the rotor 72 changes. Accordingly, information indicating the correspondence between the temperature and position of the rotor 72 and the peak values of the exciting current Ir (or the combined inductance value) corresponding to the plurality of excitation phases may be stored in the non-volatile memory of the control unit 40. It is possible to simultaneously perform an estimation of the position and the temperature of the rotor 72 based on the information stored as described above.

Figure 9C:
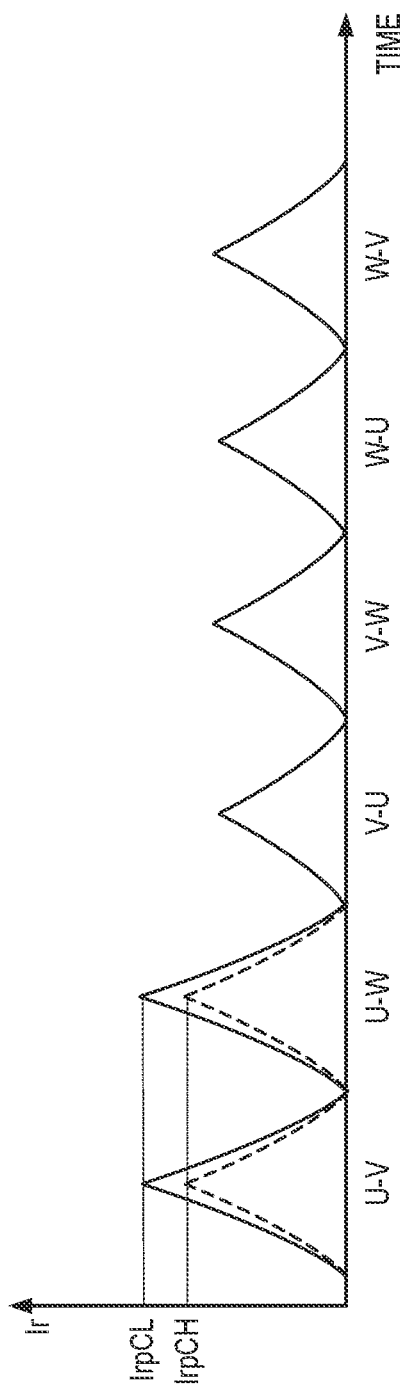
Figure 9D:
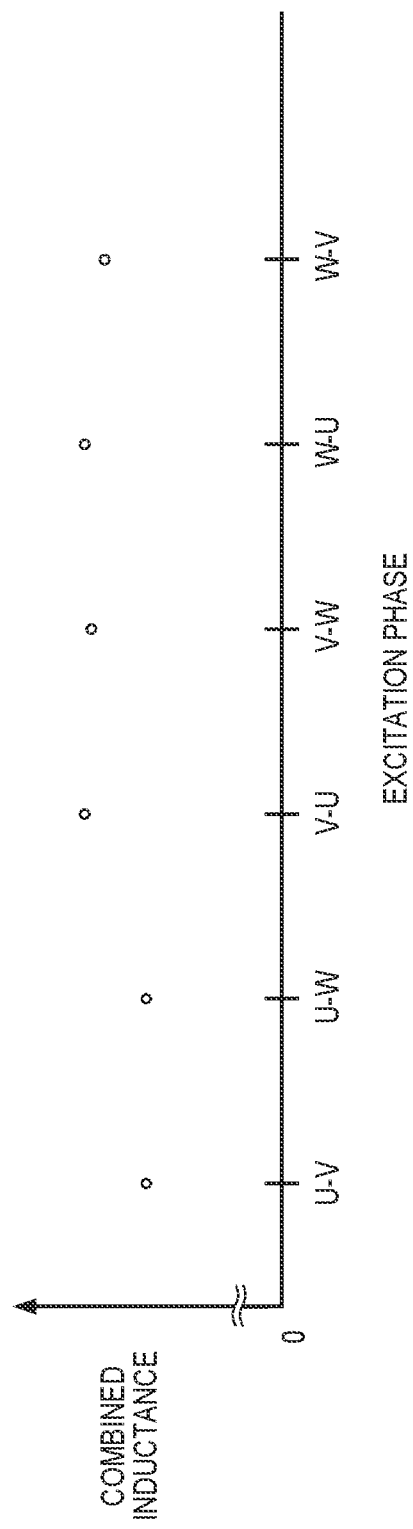

FIG. 9C illustrates a temporal change of the measurement value of the exciting current Ir in a case where the position of the rotor 72 changes from the position corresponding to FIG. 9A (the position corresponding to the U-V phase) to the position rotated by 30 degrees by the electric angle. Note that, similar to FIG. 9A, the solid line indicates the measurement result, corresponding to each excitation phase, of the peak value of the exciting current Ir in a case where the temperature of the magnets of the rotor 72 is low. In such a case, as illustrated in FIG. 9C, the peak value IrpCL or IprCH of the exciting current Ir corresponding to the U-V phase and the U-W phase are the maximum among the six excitation phases. FIG. 9D illustrates an example of a combined inductance of each excitation phase obtained from the peak value of the exciting current Ir illustrated in FIG. 9C.

In FIGS. 9C and 9D, in a case where the temperature of the magnets of the rotor 72 is high, the peak value IrpCH of the exciting current Ir corresponding to the U-V phase and the U-W phase becomes lower than the peak value IrpCL in a case where the temperature of the magnets of the rotor 72 is low. Also, both the peak value IrpCL in a case where the temperature of the magnets of the rotor 72 is low and the peak value IrpCH in a case where the temperature is high are higher than the peak values of the exciting current Ir corresponding to the other four excitation phases. This is because, as described above, the influence of an external magnetic field due to the rotor 72 is large regarding the combined inductance of the U-V phase and the combined inductance of the U-W phase corresponding to the stop position of the rotor 72.

As described above, based on the information indicating the correspondence between the temperature and position of the rotor 72 and the peak values of the exciting current Ir (or the combined inductance value) corresponding to the plurality of excitation phases, as illustrated in FIGS. 9A-9D, the position and temperature of the rotor 72 can be estimated.

<Processing Procedure>

Figure 10:
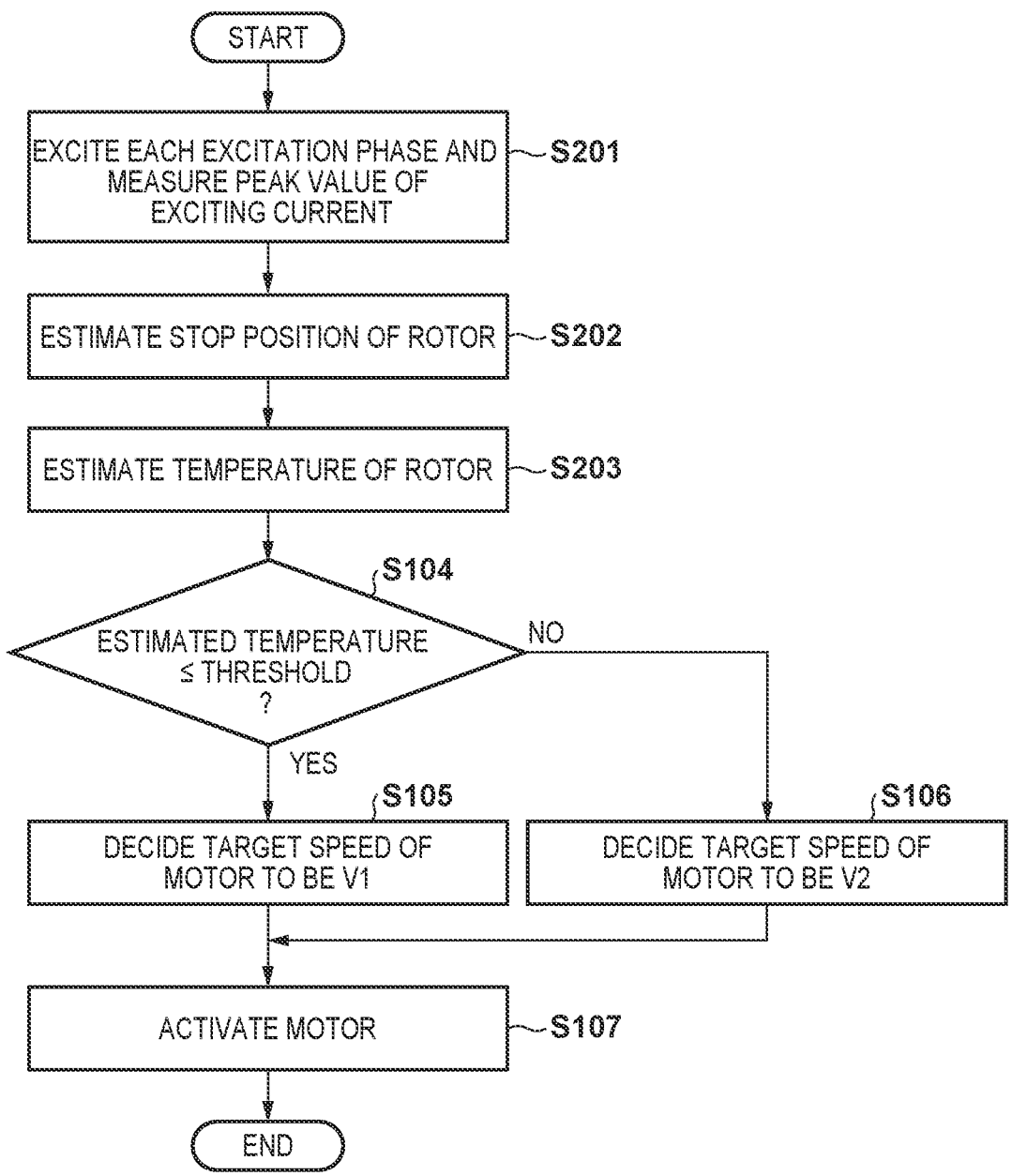
FIG. 10 is a flowchart for illustrating a processing procedure performed by a control unit (Second Embodiment).

FIG. 10 is a flowchart illustrating a processing procedure by the control unit 40 according to the present embodiment. The present procedure, similar to FIG. 6, illustrates an example in which the control unit 40 estimates the temperature of the rotor 72 and decides, based on the estimated temperature, a target speed of the motor 150 as a parameter value for control of the motor 150. In the present example, in a state where the rotor 72 is stopped, the stop position of the rotor 72 is estimated and the temperature of the rotor 72 is estimated based on the estimated stop position. In other words, control for causing the rotor 72 to stop at a predetermined position as performed in the first embodiment is not performed.

In step S201, the control unit 40 controls the motor control unit 41 so as to, in a state where the rotor 72 is stopped, excite the plurality of excitation phases respectively in order, and measures the peak values of the exciting current Ir. Here, the motor control unit 41 drives the inverter 60 by outputting from the PWM port 58 a PWM signal of a pattern for measurement of the peak value of the exciting current Ir which flows through the coils that configure each excitation phase.

Next, in step S202, the control unit 40 estimates the stop position of the rotor 72 based on the plurality of measurement values, obtained by the measurement in step S201, corresponding to the plurality of excitation phases respectively. Furthermore, in step S203, the control unit 40 estimates the temperature of the rotor 72 based on the plurality of measurement values. When estimation of the temperature of the rotor 72 is completed, the control unit 40 advances the processing to step S104. The control unit 40, similar to the first embodiment, performs processing for deciding the target speed of the motor 150 based on estimated temperature of the rotor 72.

As described above, by virtue of the present embodiment, it becomes possible to estimate the position and temperature of the rotor 72 when the motor 150 is in the stopped state and perform more appropriate control of the motor 150.

Third Embodiment

Next, a third embodiment is described. In the third embodiment, in a case where current control for controlling the exciting current by sensorless vector control is performed in the motor control unit 41, the parameter value used in the current control is decided (changed) based on the estimated temperature of the rotor 72. Hereinafter, description regarding portions in common with the first embodiment is omitted.

Figure 11:
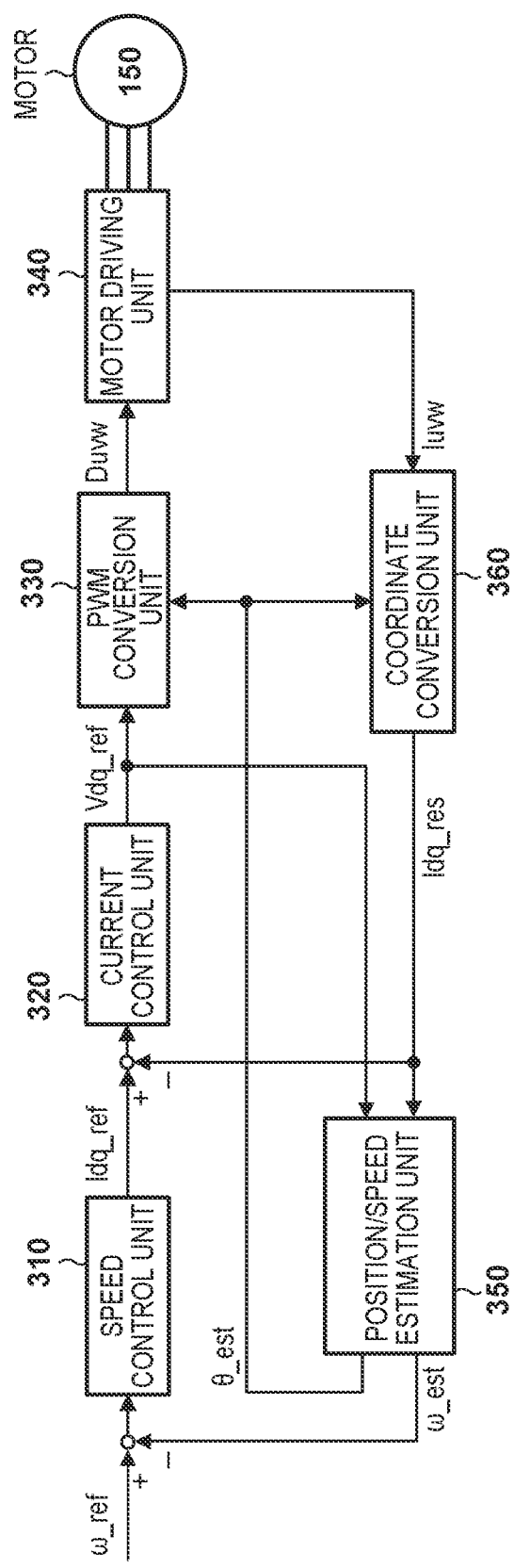
FIG. 11 illustrates an example of a functional configuration of a sensorless vector control (Third Embodiment).

FIG. 11 illustrates an example of a functional configuration of sensorless vector control executed in the motor control unit 41. Note, a functional configuration of a typical sensorless vector control is recited in Japanese Patent Laid-Open No. 2007-236015, for example. The motor control unit 41 includes a speed control unit 310, a current control unit 320, a PWM conversion unit 330, a motor driving unit 340, a position/speed estimation unit 350, and a coordinate conversion unit 360. The motor driving unit 340 includes the inverter 60 illustrated in FIG. 3.

In the motor control unit 41, the target speed $\omega\_ref$, which is a command speed, is inputted from the control unit 40. In the motor control unit 41, the difference between the target speed $\omega\_ref$ and the estimated speed $\omega\_est$ (to be described later), outputted from the position/speed estimation unit 350, is inputted to the speed control unit 310. The speed control unit 310 performs a calculation for PID control that brings the difference between the target speed $\omega\_ref$ and the estimated speed $\omega\_est$ close to 0, and calculates a command current vector $Idq\_ref$ of a dq coordinate system. A dq coordinate system corresponds to a rotating coordinate system using the position (rotational phase) of the rotor 72 as a reference. Here, $Idq\_ref=[Id\_ref, Iq\_ref]^T$ and $Id\_ref$ is a d-axis component (an excitation current component) and Iq_ref is a q-axis component (a torque current component).

The difference between the command current vector Idq_ref outputted from the speed control unit 310 and a response current vector Idq_res outputted from the coordinate conversion unit 360 are inputted to the current control unit 320. The current control unit 320 performs a calculation for PI control that brings the difference between the command current vector Idq_ref and the response current vector Idq_res close to 0, and calculates a command voltage vector Vdq_ref of the dq coordinate system. Here, Vdq_ref=[Vd_ref, Vq_ref]$^T$.

The PWM conversion unit 330, by performing reverse Park's transformation and two-phase to three-phase transformation on the command voltage vector Vdq_ref defined in the dq coordinate system, outputs duty ratio information Duvw indicating a three-phase (U phase, V phase, and W phase) duty ratio for control of the inverter 60. The motor driving unit 340 has the inverter 60 and has a function for detecting the exciting current of the motor 150 which is a three-phase motor. The motor driving unit 340 supplies the exciting current to the motor 150 by performing PWM driving of the inverter 60 based on the duty ratio information Duvw.

The exciting current that flows through the coils 73 to 75 of the motor 150 is represented as three-phase current Iuvw=[Iu, Iv, Iw]$^T$. The three-phase current Iuvw is detected by using the resistor 63 and the AD converter 53 that are connected to the inverter 60. The coordinate conversion unit 360 calculates the response current vector Idq_res by performing two-phase to three-phase transformation and Park's transformation on the detected three-phase current Iuvw. Here, Idq_res=[Id_res, Iq_res]$^T$.

The position/speed estimation unit 350, by controlling a d-axis induced voltage of the coils 73 to 75 so as to be 0 based on the induced voltage calculation formula shown by the following equation (1), for example, calculates the estimated speed ω_est from the response current vector Idq_res.

$$Ed=Vd\_ref-R \times Id\_res+\omega\_est \times Lq \times Iq\_res \quad (1)$$

Here, Ed is the d-axis induced voltage of the coils 73 to 75, Vd_ref is the d-axis component of the command voltage vector, R is the coil resistance, and Id_res is the d-axis component of the response current vector. Also, ω_est is the estimated speed regarding the rotation speed of the rotor 72, Lq is the q-axis inductance, Iq_res is the q-axis component of the response current vector.

The position/speed estimation unit 350, by integrating the estimated speed ω_est calculated as described above, further obtains an estimated angle θ_est, which is the estimated position (estimated rotational phase) of the rotor 72. The estimated speed ω_est is sent to the speed control unit 310 from the position/speed estimation unit 350. The estimated angle θ_est is sent to the PWM conversion unit 330 and the coordinate conversion unit 360 from the position/speed estimation unit 350 and is used for coordinate conversion.

The coil resistance R and q-axis inductance Lq in Equation (1) are obtained from the resistance values and the inductance values of the coils 73 to 75 of the motor 150, and change depending on the temperature of the coils 73 to 75. Generally, when the temperature of the coils 73 to 75 rises, the resistance values and the inductance values of the coils become large.

In a case where it is known in advance that the temperature of the rotor 72 and the temperature of the coils 73 to 75 are mostly the same, by estimating the temperature of the rotor 72 by the method described in the first and second embodiments, it is possible to estimate the temperature of the coils 73 to 75 from the estimated temperature of the rotor 72. In the present embodiment, based on the temperature of the coils 73 to 75 estimated as described above, the values of the coil resistance R and the q-axis inductance Lq in Equation (1) are decided (changed).

The control unit 40, based on the estimated temperature of the rotor 72 (coils 73 to 75) decides (changes) the parameter values indicating the coil resistance R and the q-axis inductance Lq for control of the motor 150 in accordance with the change of temperature. In the present embodiment, the position/speed estimation unit 350 uses the decided parameter values, which indicate the coil resistance R and the q-axis inductance Lq, for estimation of the rotation speed (estimated speed ω_est) of the rotor 72. In the motor control unit 41, control (sensorless vector control) of the motor 150 is performed by using the results of such an estimation. By this, it becomes possible to improve the accuracy of the estimated speed ω_est in the above described sensorless vector control for the motor 150 and the convergence stability of the above-mentioned estimation. Note that the position/speed estimation unit 350 may use the decided parameter values for the estimation of the rotational phase (estimated angle θ_est) of the rotor 72. Also, the position/speed estimation unit 350 may use the decided parameter values for the estimation of the induced voltage Ed induced in the plurality of the coils 73 to 75.

In the present embodiment, as described above, it is assumed that the temperature of the rotor 72 and the temperature of the coils 73 to 75 are mostly the same. However, even if the temperature of the rotor 72 and the temperature of the coils 73 to 75 are different, the temperature of the coils 73 to 75 can be estimated based on the temperature of the rotor 72 by understanding the relationship between the temperature of one and the temperature of the other in advance.

Furthermore, the above described parameter values for motor control, which are decided (changed) based on the estimated temperature of the rotor 72, are not limited to the parameter values (the coil resistance R and q-axis inductance Lq) used by the position/speed estimation unit 350. For example, gain in the PI control by the current control unit 320 is designed by the following equation using an inverse model for the primary delay system model of the resistance values and the inductance values of the coils 73 to 75.

$$Kcp=\omega c \times L$$

$$Kci=\omega c \times R$$

Here, Kcp is a proportional gain for current control and Kci is an integration gain for current control. Also, R is coil resistance, L is coil inductance, and ωc is a configuration response frequency.

Accordingly, current control gain (proportional gain Kcp and integration gain Kci) in the above formulas may be decided (changed) based on the estimated temperature of the rotor 72. Also, the control parameter value decided based on the estimated temperature of the rotor 72 may be a parameter value such as an induced voltage or torque constant influenced by the temperature of a magnet and a coil, for example.

Generally, the inductance value increases in accordance with a rise in temperature of the coil of the motor, but depending on the coil of the motor, there is also a case in which the inductance value decreases due to magnetic saturation when the temperature rises. In this case, a parameter value indicating the inductance may be set according to the temperature of the coil, and it is possible to apply a method of deciding (changing) a control parameter value in the present embodiment even if the inductance value increases or decreases in accordance with a rise in temperature.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-094909, filed May 29, 2020, which is hereby incorporated by reference herein in its entirety.

What is claimed is:

1. A motor control apparatus, comprising:
   an excitation unit configured to excite an excitation phase targeted for excitation among a plurality of excitation phases of a motor;
   a measurement unit configured to, in a state in which a rotor of the motor is stopped, excite, by the excitation unit, an excitation phase corresponding to a stop position of the rotor among the plurality of the excitation phases, and to measure a physical quantity which changes in accordance with an inductance of at least one of a plurality of coils configuring the plurality of excitation phases;
   an estimation unit configured to estimate a temperature of the rotor from a measurement value of the physical quantity measured by the measurement unit; and
   a decision unit configured to decide a parameter value for control of the motor based on an estimated temperature obtained by the estimation unit,
   wherein the measurement unit, in a state in which the rotor of the motor is stopped, excites each of the plurality of the excitation phases in order and measures the physical quantity when each excitation phase is excited, and
   the estimation unit estimates the stop position of the rotor and estimates the temperature of the rotor, based on a plurality of measurement values that are obtained by measurement by the measurement unit and that respectively correspond to the plurality of excitation phases.

2. The motor control apparatus according to claim 1, wherein the measurement unit measures, as the physical quantity, a peak value of an exciting current which flows through a coil configuring the excitation phase excited by the excitation unit.

3. The motor control apparatus according to claim 2, further comprising:
   a storage unit in which information indicating correspondence between a peak value of the exciting current and the temperature of the rotor is stored, wherein
   the estimation unit obtains, based on the information stored in the storage unit, the temperature corresponding to the peak value as the estimated temperature.

4. The motor control apparatus according to claim 1, wherein the measurement unit measures, as the physical quantity, a rising time and a falling time of an exciting current which flows through a coil configuring the excitation phase excited by the excitation unit.

5. The motor control apparatus according to claim 2, wherein the excitation unit supplies a current to a coil configuring the excitation phase targeted for excitation, and
   the measurement unit, in a state where the rotor of the motor is stopped, drives the excitation unit such that an exciting current which flows through the coil configuring the excitation phase targeted for excitation increases in a first period and an exciting current which flows through the coil decreases in a second period which follows the first period, and measures an exciting current which flows through the coil.

6. The motor control apparatus according to claim 1, wherein the excitation phase excited by the excitation unit and corresponding to the stop position of the rotor is an excitation phase, among the plurality of excitation phases, whose amount of decrease in inductance of the excitation phase due to an influence of an external magnetic field corresponding larger than any other excitation phase in correspondence with the stop position.

7. The motor control apparatus according to claim 1, wherein the measurement unit, prior to a start of measurement of the physical quantity, drives the excitation unit such that the rotor will stop at a position corresponding to a predetermined excitation phase, and after the rotor stops, the measurement unit starts measurement of the physical quantity.

8. The motor control apparatus according to claim 1, wherein the estimation unit, among a plurality of measurement values that respectively correspond to the plurality of excitation phases, determines a measurement value indicating that an inductance of a coil configuring a corresponding excitation phase is at a minimum, and determines a position at which the rotor will stop in a case where the excitation phase corresponding to the measurement value is excited, to be the stop position.

9. The motor control apparatus according to claim 1, wherein the decision unit decides, based on the estimated temperature, a target speed which is a target value of a rotation speed of the rotor.

10. The motor control apparatus according to claim 9, wherein the decision unit decides, in a case where the estimated temperature is equal to or less than a threshold, the target speed to be a first speed, and decides, in a case where the estimated temperature is not equal to or less than the threshold, the target speed to be a second speed which is lower than the first speed.

11. The motor control apparatus according to claim 1, wherein the decision unit decides, based on the estimated temperature, an acceleration of the rotor.

12. The motor control apparatus according to claim 11, wherein the decision unit decides, in a case where the estimated temperature is equal to or less than a threshold, the acceleration to be a first acceleration, and decides, in a case where the estimated temperature is not equal to or less than the threshold, the acceleration to be a second acceleration lower than the first acceleration.

13. The motor control apparatus according to claim 1, wherein the decision unit decides, based on the estimated temperature, parameter values indicating a coil resistance and an inductance value for control of the motor.

14. The motor control apparatus according to claim 13, further comprising a control unit configured to control the motor by using parameter values decided by the decision unit,
wherein the control unit uses the parameter values, which indicate a coil resistance and an inductance value and which are decided by the decision unit, to estimate a rotation speed or a rotational phase of the rotor, and controls the motor by using the estimated rotation speed or the rotational phase.

15. The motor control apparatus according to claim 13, further comprising a control unit configured to control the motor by using parameter values decided by the decision unit,
wherein the control unit uses the parameter values, which indicate a coil resistance and an inductance value and which are decided by the decision unit, to estimate an induced voltage induced in the plurality of coils, and controls the motor by using the estimated induced voltage.

16. The motor control apparatus according to claim 1, further comprising a control unit configured to control the motor by using a parameter value decided by the decision unit,
wherein the control unit controls driving of the excitation unit by performing, using the parameter value, current control for controlling, based on a current component in a rotating coordinate system that uses a rotational phase of the rotor as a reference, an exciting current which flows through the plurality of coils, and
the decision unit decides, based on the estimated temperature, a parameter value used for the current control.

17. The motor control apparatus according to claim 16, wherein the decision unit decides a current control gain used for the current control.

18. A motor control apparatus, comprising:
an excitation unit configured to excite an excitation phase targeted for excitation among a plurality of excitation phases of a motor;
a measurement unit configured to, in a state in which a rotor of the motor is stopped, excite, by the excitation unit, an excitation phase corresponding to a stop position of the rotor among the plurality of excitation phases, and to measure a physical quantity which changes in accordance with an inductance of at least one of a plurality of coils configuring the plurality of excitation phases; and
a decision unit configured to decide a parameter value for control of the motor based on the physical quantity measured by the measurement unit,
wherein the excitation unit supplies a current to a coil configuring the excitation phase targeted for excitation, and
the measurement unit, in a state where the rotor of the motor is stopped, drives the excitation unit such that an exciting current which flows through the coil configuring the excitation phase targeted for excitation increases in a first period and an exciting current which flows through the coil decreases in a second period which follows the first period, and measures, as the physical quantity, a peak value of an exciting current which flows through the coil.

19. An image forming apparatus comprising:
a rotating member for conveying a sheet along a conveyance path;
an image forming unit configured to form an image on the sheet conveyed along the conveyance path;
a motor configured to drive the rotating member or the image forming unit; and
a motor control apparatus configured to control the motor,
wherein the motor control apparatus comprises:
an excitation unit configured to excite an excitation phase targeted for excitation among a plurality of excitation phases of a motor;
a measurement unit configured to, in a state in which a rotor of the motor is stopped, excite, by the excitation unit, an excitation phase corresponding to a stop position of the rotor among the plurality of the excitation phases, and to measure a physical quantity which changes in accordance with an inductance of at least one of a plurality of coils configuring the plurality of excitation phases;
an estimation unit configured to estimate a temperature of the rotor from a measurement value of the physical quantity measured by the measurement unit; and
a decision unit configured to decide a parameter value for control of the motor based on an estimated temperature obtained by the estimation unit,
wherein the measurement unit, in a state in which the rotor of the motor is stopped, excites each of the plurality of the excitation phases in order and measures the physical quantity when each excitation phase is excited, and
the estimation unit estimates the stop position of the rotor and estimates the temperature of the rotor, based on a plurality of measurement values that are obtained by measurement by the measurement unit and that respectively correspond to the plurality of excitation phases.

20. The image forming apparatus according to claim 19, further comprising:
a fan for cooling the motor; and
a unit configured to control a rotation frequency of the fan based on the estimated temperature.

21. A motor control apparatus, comprising:
an excitation unit configured to excite an excitation phase targeted for excitation among a plurality of excitation phases of a motor;
a measurement unit configured to, in a state in which a rotor of the motor is stopped, excite, by the excitation unit, an excitation phase corresponding to a stop position of the rotor among the plurality of the excitation phases, and to measure a physical quantity which changes in accordance with an inductance of at least one of a plurality of coils configuring the plurality of excitation phases;

an estimation unit configured to estimate a temperature of the rotor from a measurement value of the physical quantity measured by the measurement unit; and a decision unit configured to decide a parameter value for control of the motor based on an estimated temperature obtained by the estimation unit, wherein the decision unit decides, based on the estimated temperature, a target speed which is a target value of a rotation speed of the rotor.

22. A motor control apparatus, comprising:

an excitation unit configured to excite an excitation phase targeted for excitation among a plurality of excitation phases of a motor;

a measurement unit configured to, in a state in which a rotor of the motor is stopped, excite, by the excitation unit, an excitation phase corresponding to a stop position of the rotor among the plurality of the excitation phases, and to measure a physical quantity which changes in accordance with an inductance of at least one of a plurality of coils configuring the plurality of excitation phases;

an estimation unit configured to estimate a temperature of the rotor from a measurement value of the physical quantity measured by the measurement unit; and a decision unit configured to decide a parameter value for control of the motor based on an estimated temperature obtained by the estimation unit, wherein the excitation unit supplies a current to a coil configuring the excitation phase targeted for excitation, and the measurement unit, in a state where the rotor of the motor is stopped, drives the excitation unit such that an exciting current which flows through the coil configuring the excitation phase targeted for excitation increases in a first period and an exciting current which flows through the coil decreases in a second period which follows the first period, and measures, as the physical quantity, a peak value of an exciting current which flows through the coil.

* * * * *